United States Patent
Mangelschots

(10) Patent No.: US 12,090,807 B2
(45) Date of Patent: Sep. 17, 2024

(54) SCALABLE DAMPER

(71) Applicant: TENNECO AUTOMOTIVE OPERATING COMPANY, INC., Lake Forest, IL (US)

(72) Inventor: Gert Mangelschots, Heusden-Zolder (BE)

(73) Assignee: Tenneco Automotive Operating Company, Inc., Lake Forest, IL (US)

( * ) Notice: Subject to any disclaimer, the term of this patent is extended or adjusted under 35 U.S.C. 154(b) by 531 days.

(21) Appl. No.: 17/435,173

(22) PCT Filed: May 13, 2020

(86) PCT No.: PCT/US2020/032559
§ 371 (c)(1),
(2) Date: Aug. 31, 2021

(87) PCT Pub. No.: WO2020/232043
PCT Pub. Date: Nov. 19, 2020

(65) Prior Publication Data
US 2022/0144036 A1    May 12, 2022

Related U.S. Application Data

(60) Provisional application No. 62/847,620, filed on May 14, 2019.

(51) Int. Cl.
*F16F 9/46* (2006.01)
*B60G 13/08* (2006.01)
(Continued)

(52) U.S. Cl.
CPC ............ *B60G 17/08* (2013.01); *B60G 13/08* (2013.01); *F16F 9/185* (2013.01); *F16F 9/46* (2013.01);
(Continued)

(58) Field of Classification Search
CPC .... B60G 17/08; B60G 13/08; B60G 2202/24; B60G 2204/62; B60G 2206/41;
(Continued)

(56) References Cited

U.S. PATENT DOCUMENTS 3,090,611 A * 5/1963 Schultze .............. B60G 21/073
280/124.159
4,275,900 A * 6/1981 Andreoli .............. B60G 17/033
280/283
(Continued)

FOREIGN PATENT DOCUMENTS

| CN | 203717771 U | 7/2014 |
| CN | 204553662 U | 8/2015 |

(Continued)

OTHER PUBLICATIONS

International Search Report and Written Opinion of the International Searching Authority issued in PCT/US2020/032559, mailed on Aug. 24, 2020; ISA/KR.

*Primary Examiner* — Christopher P Schwartz
(74) *Attorney, Agent, or Firm* — Harness, Dickey & Pierce, P.L.C.

(57) ABSTRACT

A damper including a pressure tube, a piston, and a reserve tube is provided. The piston is arranged inside the pressure tube and divides the pressure tube into first and second working chambers. The reserve tube extends about the pressure tube to define a reserve tube chamber between the pressure tube and the reserve tube. A first damper port is arranged in communication with the second working chamber and a second damper port is arranged in communication with the reserve tube chamber. A remote valve assembly is spaced from the damper. The remote valve assembly includes a first electromagnetic valve that is arranged in communication with the first damper port by a first hydraulic line and a second electromagnetic valve that is arranged in
(Continued)

communication with the second damper port by a second hydraulic line. An accumulator is arranged in communication with the first and second electromagnetic valves.

19 Claims, 16 Drawing Sheets

(51) Int. Cl.
  *B60G 17/08* (2006.01)
  *F16F 9/18* (2006.01)
(52) U.S. Cl.
  CPC ...... *B60G 2202/24* (2013.01); *B60G 2204/62* (2013.01); *B60G 2206/41* (2013.01); *B60G 2500/11* (2013.01); *B60G 2800/162* (2013.01); *F16F 2222/12* (2013.01); *F16F 2228/066* (2013.01); *F16F 2232/08* (2013.01); *F16F 2234/02* (2013.01)
(58) Field of Classification Search
  CPC . B60G 2500/11; B60G 2800/162; F16F 9/46; F16F 9/185; F16F 2222/12; F16F 2228/066; F16F 2232/08; F16F 2234/02
  USPC ... 188/266.1–266.5, 322.13, 322.14, 322.19, 188/322.2, 322.21
  See application file for complete search history.

(56) References Cited

U.S. PATENT DOCUMENTS

| | | | | |
|---|---|---|---|---|
| 4,491,207 A | * | 1/1985 | Boonchanta | F16F 9/46 188/266.5 |
| 4,828,231 A | * | 5/1989 | Fukumura | F16F 9/088 267/64.19 |
| 4,936,424 A | | 6/1990 | Costa | |
| 5,141,244 A | * | 8/1992 | Clotault | B60G 17/08 280/124.102 |
| 5,251,730 A | * | 10/1993 | Ackermann | F16F 9/465 188/315 |
| 5,351,790 A | * | 10/1994 | Machida | B60G 13/003 188/266.2 |
| 6,213,263 B1 | | 4/2001 | De Frenne | |
| 6,254,067 B1 | * | 7/2001 | Yih | F16F 9/446 267/64.22 |
| 6,286,641 B1 | * | 9/2001 | De Frenne | F16F 9/096 188/314 |
| 7,128,192 B2 | | 10/2006 | Fox | |
| 7,543,824 B2 | * | 6/2009 | Chapman | B60G 17/0408 280/5.514 |
| 8,276,719 B2 | | 10/2012 | Trujillo et al. | |
| 10,464,389 B2 | * | 11/2019 | Zuleger | F16F 9/34 |
| 10,737,546 B2 | * | 8/2020 | Tong | F16F 9/065 |
| 11,761,507 B2 | * | 9/2023 | Deferme | F16F 9/062 188/266.2 |
| 2007/0045067 A1 | | 3/2007 | Schedgick et al. | |
| 2008/0224437 A1 | | 9/2008 | Vanhees | |
| 2008/0250844 A1 | | 10/2008 | Gartner | |
| 2012/0145496 A1 | | 6/2012 | Goetz et al. | |
| 2016/0025179 A1 | | 1/2016 | Coombs et al. | |
| 2016/0059664 A1 | | 3/2016 | Tucker et al. | |
| 2017/0240019 A1 | | 8/2017 | Six et al. | |
| 2017/0356522 A1 | | 12/2017 | Kurita | |
| 2020/0208704 A1 | | 7/2020 | Deferme | |

FOREIGN PATENT DOCUMENTS

| | | |
|---|---|---|
| EP | 1659310 B1 | 10/2009 |
| EP | 1987268 B1 | 6/2014 |
| WO | 2006065235 A2 | 6/2006 |

* cited by examiner

SCALABLE DAMPER

CROSS-REFERENCE TO RELATED APPLICATIONS

This application is a U.S. National Phase Application under 35 U.S.C. 371 of International Application No. PCT/US2020/032559, filed on May 13, 2020, which claims the benefit of U.S. Provisional Application No. 62/847,620 filed on May 14, 2019. The entire disclosures of the above applications are incorporated herein by reference.

FIELD

The present disclosure relates generally to dampers for vehicle suspension systems and more particularly to a standardized damper design that can be connected to any one of several different remote valve assemblies to provide different damping modes and characteristics.

BACKGROUND

The statements in this section merely provide background information related to the present disclosure and may not constitute prior art.

In general, dampers are used to absorb and dissipate the impact and rebound movement of a vehicle's suspension system and keep the vehicle's tires in contact with the ground. Dampers are typically installed alongside a spring (as a stand-alone shock absorber) or inside a spring (as part of a coil-over shock and strut assembly) and placed in front and rear suspension systems. The damper is attached to a frame member or other sprung component of the vehicle by an upper mount and is attached to a suspension member or other unsprung component of the suspension by a lower mount.

Conventional hydraulic dampers include a pressure tube, which acts as a hydraulic cylinder. A piston is slidably disposed within the pressure tube with the piston separating the interior of the pressure tube into first and second working chambers. A piston rod is connected to the piston and extends out of one end of the pressure tube where it is adapted for attachment to a sprung or unsprung component of the vehicle. The opposite end of the pressure tube is adapted for attachment to the other sprung or unsprung component of the vehicle.

Conventional dual tube hydraulic dampers also include a reserve tube that extends annularly about the pressure tube to define a reserve tube chamber. The reserve tube chamber is positioned radially between the pressure tube and the reserve tube. Such dampers typically include a first valving system incorporated within the piston that functions to create a damping load during the damper's extension (i.e., rebound stroke) and a second valving system incorporated within a base valve assembly that functions to create a damping force during the damper's compression stroke.

The assignee of the subject application has developed a different style of dual tube hydraulic damper where the valving systems typically incorporated in the piston and the base valve assembly have been replaced by two electromagnetic valves that are mounted to the reserve tube. This damper configuration is described in U.S. patent application Ser. No. 16/234,725, filed on Dec. 28, 2018, which is expressly incorporated by reference. In accordance with this damper configuration, one of the electromagnetic valves is connected in fluid communication with the reserve tube chamber and the other electromagnetic valve is connected in fluid communication with the second working chamber.

SUMMARY

This section provides a general summary of the disclosure, and is not a comprehensive disclosure of its full scope or all of its features.

In accordance with one aspect of the present disclosure, a damper assembly including a pressure tube, a piston, a reserve tube, and a remote valve assembly is provided. The pressure tube extends annularly about a damper axis and the piston is arranged in sliding engagement inside the pressure tube. The piston divides the pressure tube into a first working chamber and a second working chamber. A piston rod extends longitudinally through the first working chamber along the damper axis. The piston rod has a first piston rod end and a second piston rod end. The second piston rod end is coupled to the piston. The reserve tube extends annularly about the pressure tube to define a reserve tube chamber. The reserve tube chamber is positioned radially between the pressure tube and the reserve tube. A first damper port is arranged in fluid communication with the second working chamber and a second damper port is arranged in fluid communication with the reserve tube chamber. The remote valve assembly is spaced away from the pressure tube and the reserve tube. The remote valve assembly includes a first electromagnetic valve that is connected in fluid communication with the first damper port by a first hydraulic line and a second electromagnetic valve that is connected in fluid communication with the second damper port by a second hydraulic line. The remote valve assembly also includes an accumulator that is connected in fluid communication with at least one of the first and second electromagnetic valves.

In accordance with another aspect of the present disclosure, the damper assembly further includes a damper body having a stepped bore with a first stepped segment and a second stepped segment. The pressure tube extends longitudinally between a first pressure tube end and a second pressure tube end and the reserve tube extends longitudinally between a first reserve tube end and a second reserve tube end. The second pressure tube end is received in the first stepped segment of the stepped bore in the damper body and the second reserve tube end is received in the second stepped segment of the stepped bore in the damper body. The first damper port extends through the damper body to the first stepped segment of the stepped bore such that the first damper port is arranged in fluid communication with the second working chamber. The second damper port extends through the damper body to the second stepped segment of the stepped bore such that the second damper port is arranged in fluid communication with the reserve tube chamber. The remote valve assembly is spaced away from the damper body. The remote valve assembly has a valve block that includes a first valve bore that receives the first electromagnetic valve, a second valve bore that receives the second electromagnetic valve, and a passageway extending between at least one of the first and second valve bores and the accumulator. The valve block of the remote valve assembly also includes a first remote valve port that extends through the valve block to the first valve bore and a second remote valve port that extends through the valve block to the second valve bore. The first remote valve port is connected to the first damper port via the first hydraulic line and the second remote valve port is connected to the second damper port via the second hydraulic line.

In accordance with another aspect of the present disclosure, the damper assembly includes three interchangeable remote valve assemblies where any one of the three remote valve assemblies can be connected in fluid communication with the damper at a location that is spaced away from the damper. The first remote valve assembly includes a first valve block having a first valve bore that is configured to receive the first electromagnetic valve, a second valve bore that is configured to receive the second electromagnetic valve, and a common valve passageway that extends between the first and second valve bores. The common valve passageway in the first valve block is configured to communicate with the accumulator. The first remote valve assembly also includes a first remote valve port that extends through the first valve block to the first valve bore and a second remote valve port that extends through the first valve block to the second valve bore. The first remote valve port is configured to connect to the first hydraulic line and the second remote valve port is configured to connect to the second hydraulic line.

The second remote valve assembly includes a second valve block having a first valve bore that is configured to receive the first electromagnetic valve, a second valve bore that is configured to receive the second electromagnetic valve, a passageway that extends between the first valve bores and the accumulator, and a switch valve. The second remote valve assembly also includes a first remote valve port that extends through the second valve block to the first valve bore and a second remote valve port that extends through the second valve block to the second valve bore. The first remote valve port is configured to connect to the first hydraulic line and the second remote valve port is configured to connect to the second hydraulic line. The second remote valve assembly has a third remote valve port that is arranged in fluid communication with the first valve bore and a fourth remote valve port that is arranged in fluid communication with the second valve bore. The third remote valve port is configured to connect to a third hydraulic line and the fourth remote valve port is configured to connect to a fourth hydraulic line. The switch valve of the second remote valve assembly has a first position where the switch valve opens a fluid connection between the first and second valve bores and a second position where the switch valve closes the fluid connection between the first and second valve bores.

The third remote valve assembly includes a third valve block having a first valve bore that is configured to receive the first electromagnetic valve, a second valve bore that is configured to receive the second electromagnetic valve, a common valve passageway that extends between the first and second valve bores, and a switch valve. The common valve passageway in the third valve block is configured to communicate with the accumulator. The third remote valve assembly also includes a first remote valve port that extends through the third valve block to the first valve bore and a second remote valve port that extends through the third valve block to the second valve bore. The first remote valve port is configured to connect to the first hydraulic line and the second remote valve port is configured to connect to the second hydraulic line. The third remote valve assembly has a third remote valve port that is arranged in fluid communication with the common valve passageway and a fourth remote valve port that is arranged in fluid communication with either the first valve bore or the second valve bore depending on a position of the switch valve. The switch valve of the third remote valve assembly has a first position where the switch valve connects the fourth remote valve port in fluid communication with the first valve bore and a second position where the switch valve connects the fourth remote valve port in fluid communication with the second valve bore. The third remote valve port is configured to connect to a third hydraulic line and the fourth remote valve port is configured to connect to a fourth hydraulic line.

As noted above, the first, second, and third remote valve assemblies are interchangeable. Any one of the first, second, and third remote valve assemblies can accommodate the first and second electromagnetic valves and the accumulator and can be connected to the damper via the first and second hydraulic lines. This interchangeability of the remote valve assemblies allows for different damper assemblies with different operational characteristics to be assembled using one standardized damper design. The only component that needs to be changed is the remote valve assembly. This leads to manufacturing efficiencies that reduce the cost of the damper assemblies. In addition, the damper assemblies disclosed herein provide more flexible packaging solutions because the remote valve assembly is spaced from the damper and can therefore be mounted in a wide variety of different locations. This is particularly useful in vehicles with significant packaging constraints in the area where the damper is mounted.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
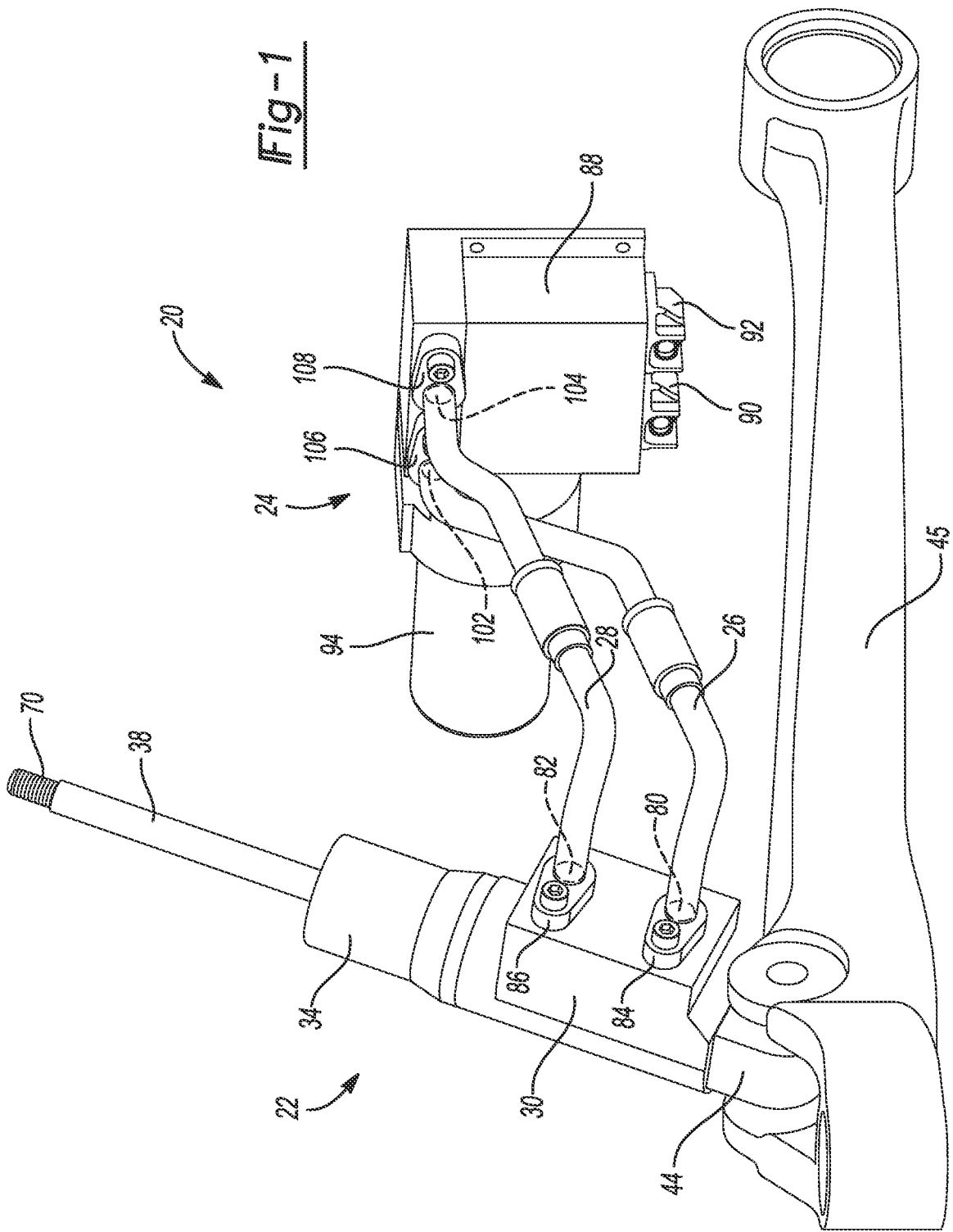
FIG. 1 is a side perspective view of an exemplary damper assembly that is constructed in accordance with the teachings of the present disclosure.

Referring to the Figures, wherein like numerals indicate corresponding parts throughout the several views, several damper assemblies 20, 20', 20" are illustrated.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
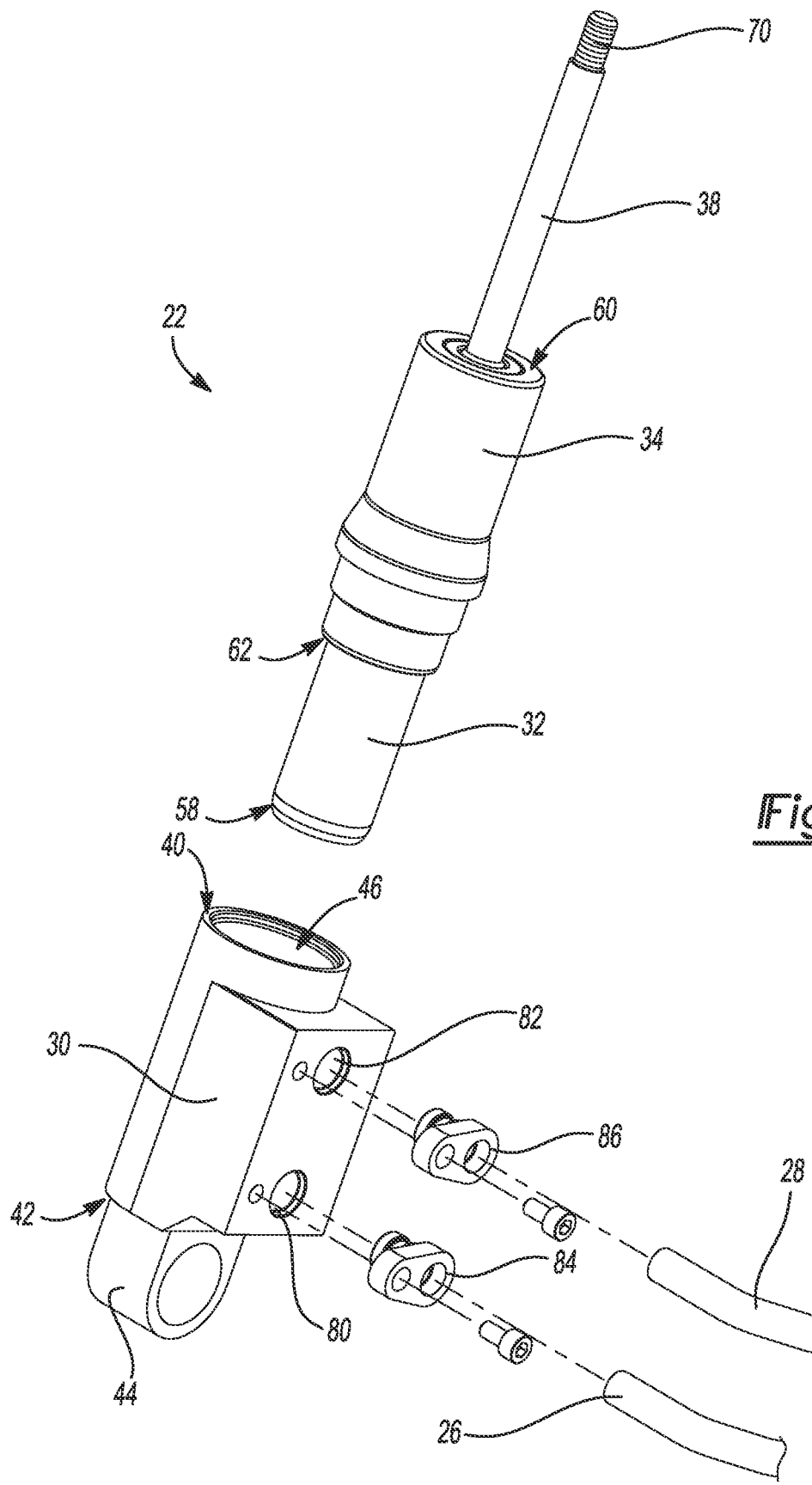
FIG. 2 is an exploded perspective view of an exemplary damper of the damper assembly illustrated in FIG. 1.
Figure 3:
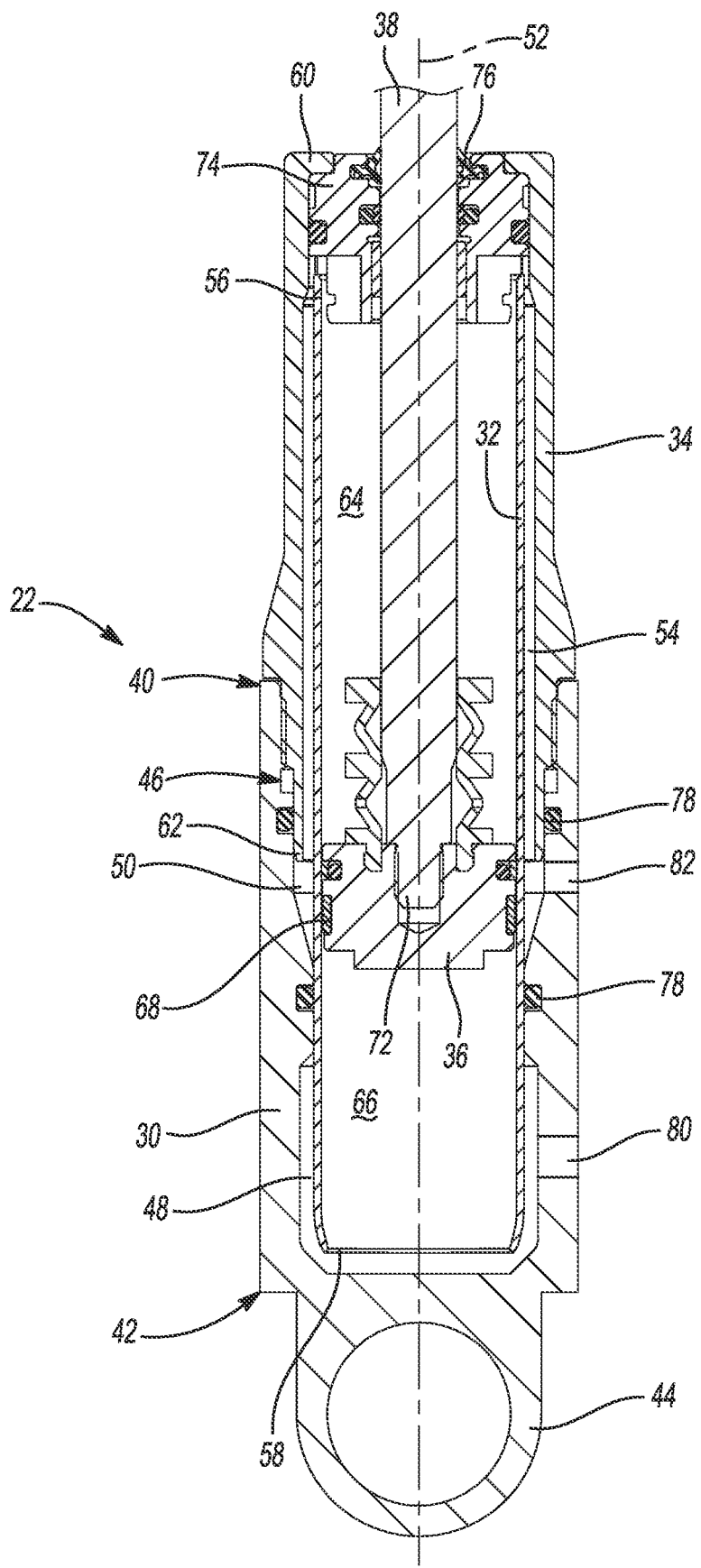
FIG. 3 is a side cross-section view of the exemplary damper illustrated in FIG. 2.

With reference to FIGS. 1-3, a first damper assembly 20 is illustrated. The first damper assembly 20 includes a damper 22 and a first remote valve assembly 24 that is connected in fluid communication with the damper 22 by a first hydraulic line 26 and a second hydraulic line 28. The damper 22 includes a damper body 30, a pressure tube 32, a reserve tube 34, a piston 36, and a piston rod 38. The damper body 30 extends longitudinally between a first body end 40 and a second body end 42. The second body end 42 includes an attachment feature 44 that is configured to be mechanically connected to either a sprung or unsprung component 45 of a vehicle (not shown). The damper body 30 has a stepped bore 46 that is open at the first body end 40 and closed at the second body end 42. The stepped bore 46 includes a first stepped segment 48 adjacent to the second body end 42 and a second stepped segment 50 adjacent to the first body end 40. The first stepped segment 48 has a smaller diameter than the second stepped segment 50.

The pressure tube 32 extends annularly about a damper axis 52 and the reserve tube 34 extends annularly about the pressure tube 32 to define a reserve tube chamber 54 that is positioned radially between the pressure tube 32 and the reserve tube 34. The pressure tube 32 extends longitudinally between a first pressure tube end 56 and a second pressure tube end 58 and the reserve tube 34 extends longitudinally between a first reserve tube end 60 and a second reserve tube end 62.

The piston 36 is arranged in sliding engagement inside the pressure tube 32 and divides the pressure tube 32 into a first working chamber 64 and a second working chamber 66. Although other configurations are possible, in the illustrated examples, the piston 36 is a closed piston 36 and therefore that lacks passageways for communicating fluid between the first and second working chambers 64, 66. A piston seal 68 is disposed between the piston 36 and the pressure tube 32 to permit sliding movement of the piston 36 with respect to the pressure tube 32 without generating undue frictional forces as well as sealing the first working chamber 64 from the second working chamber 66. The piston rod 38 extends longitudinally along the damper axis 52 between a first piston rod end 70 and a second piston rod end 72. The second piston rod end 72 is attached (i.e., coupled) to the piston 36. The piston rod 38 extends through the first working chamber 64 and through a rod guide assembly 74. Accordingly, the first piston rod end 70 is always positioned outside the pressure tube 32. The rod guide assembly 74 is positioned inside the first reserve tube end 60 and mates with the first pressure tube end 56 to close off the first working chamber 64. A seal assembly 76 seals the interface between the rod guide assembly 74 and the piston rod 38.

The first piston rod end 70 is adapted to be secured to either a sprung or unsprung component of a vehicle (not shown). Because the piston rod 38 extends only through the first working chamber 64 and not the second working chamber 66, extension and compression movements of the piston 36 with respect to the pressure tube 32 causes a difference in the amount of fluid displaced in the first working chamber 64 compared to the amount of fluid displaced in the second working chamber 66. The difference in the amount of fluid displaced is known as the "rod volume." During compression and extension (i.e., rebound) stokes of the damper 22, fluid flows through the first remote valve assembly 24 to accommodate for changes in rod volume. When the damper 22 extends in length during an extension stroke, an additional volume of fluid is needed in the second working chamber 66 due to the rod volume and fluid will flow from the reserve tube chamber 54 to the second working chamber 66 through the first remote valve assembly 24. When the damper 22 compresses in length during a compression stroke, an excess of fluid must be removed from the second working chamber 66 due to the rod volume. Thus, fluid will flow from the second working chamber 66 to the reserve tube chamber 54 through the first remote valve assembly 24.

The pressure tube 32 and the reserve tube 34 are positioned in a co-axial arrangement where the second pressure tube end 58 extends/protrudes longitudinally beyond the second reserve tube end 62. The second reserve tube end 62 is received in the second stepped segment 50 of the stepped bore 46 in the damper body 30 and the second pressure tube end 58 is received in the first stepped segment 48 of the stepped bore 46 in the damper body 30. As a result of this arrangement, at least a portion of the second stepped segment 50 of the stepped bore 46 in the damper body 30 is arranged in fluid communication with the reserve tube chamber 54 and at least a portion of the first stepped segment 48 of the stepped bore 46 in the damper body 30 is arranged in fluid communication with the second working chamber 66. Optionally, O-ring seals 78 may be provided between the reserve tube 34 and the second stepped segment 50 of the stepped bore 46 in the damper body 30 and between the pressure tube 32 and the first stepped segment 48 of the stepped bore 46 in the damper body 30.

The damper body 30 includes a first damper port 80 and a second damper port 82. The first damper port 80 extends through the damper body 30 to the first stepped segment 48 of the stepped bore 46. As a result, the first damper port 80 is arranged in fluid communication with the second working chamber 66. The second damper port 82 extends through the damper body 30 to the second stepped segment 50 of the stepped bore 46. As a result, the second damper port 82 is arranged in fluid communication with the reserve tube chamber 54. The first hydraulic line 26 is connected to the first damper port 80 by a first damper fitting 84 and the second hydraulic line 28 is connected to the second damper port 82 by a second damper fitting 86.

Figure 4:
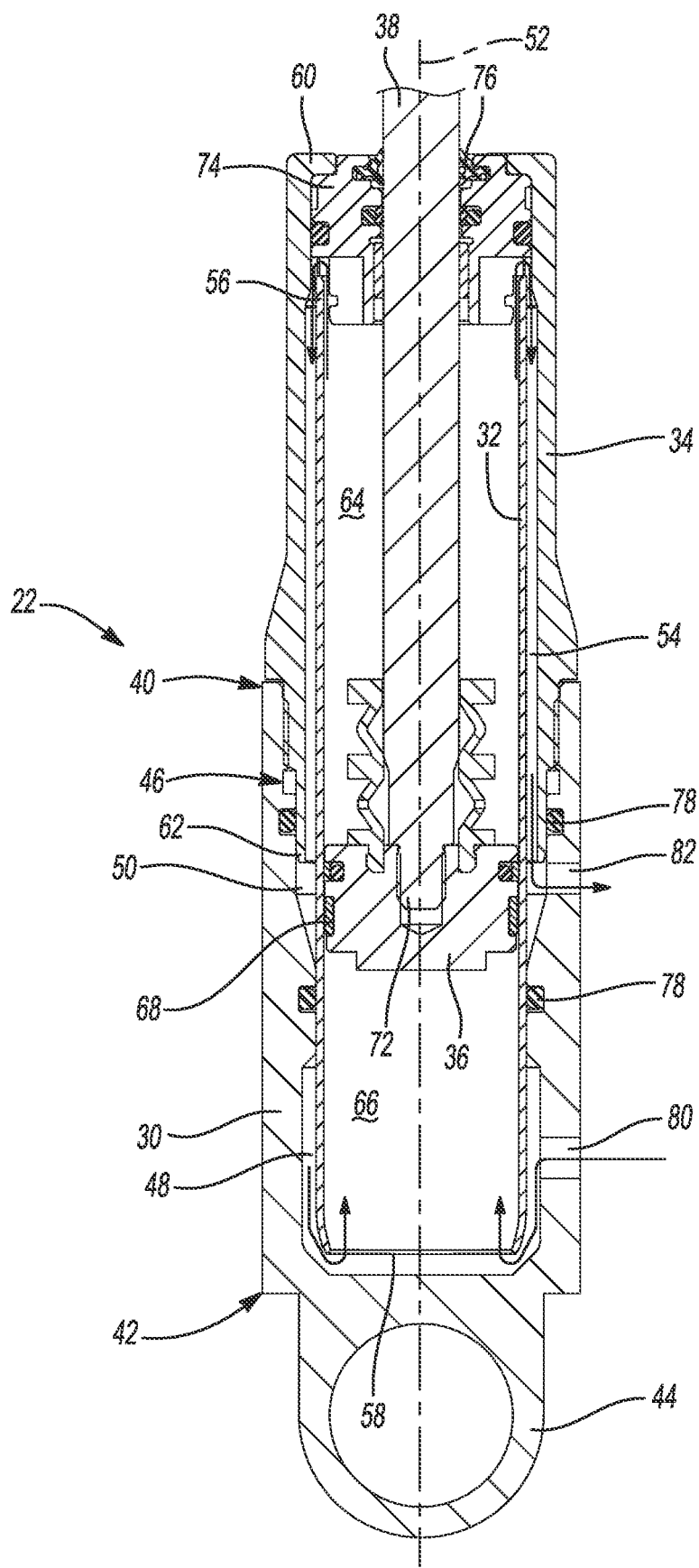
FIG. 4 is another side cross-section view of the exemplary damper illustrated in FIG. 3, where the damper is shown during an extension (i.e., rebound) stroke.

FIG. 4 illustrates the damper 22 during an extension (i.e., rebound) stroke. As a result, FIG. 4 illustrates an operating condition of the damper 22 where the piston 36 is moving towards the rod guide assembly 74. As a result, the first working chamber 64 decreases in volume and the second working chamber 66 increases in volume during an extension stroke. Because the piston 36 is a closed piston 36, there is no fluid flow directly between the first and second working chambers 64, 66. Instead, fluid in the first working chamber 64 flows into the reserve tube chamber 54 via slots in the rod guide assembly 74 where the rod guide assembly 74 meets the first pressure tube end 56. The fluid in the reserve tube chamber 54 exits the damper 22 through the second damper port 82 and enters the second hydraulic line 28. The increasing volume of the second working chamber 66 is filled by fluid that is supplied to the damper 22 by the first hydraulic line 26. This fluid enters the second working chamber 66 via the first damper port 80. Rebound damping is controlled by the first remote valve assembly 24, which controls the flow of fluid into and out of the first and second hydraulic lines 26, 28.

Figure 5:
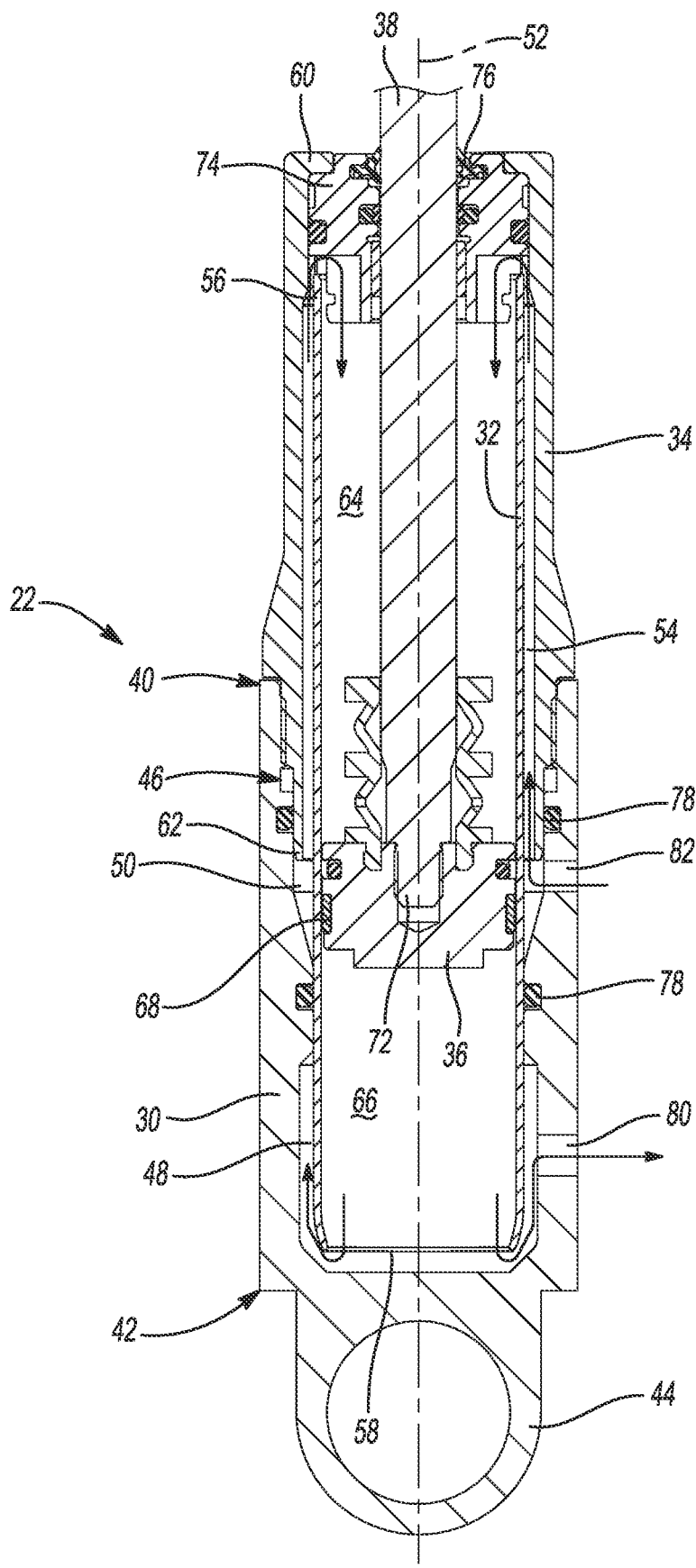
FIG. 5 is another side cross-section view of the exemplary damper illustrated in FIG. 3, where the damper is shown during a compression stroke.

FIG. 5 illustrates the damper 22 during a compression stroke. As a result, FIG. 5 illustrates an operating condition of the damper 22 where the piston 36 is moving away from the rod guide assembly 74. As a result, the first working chamber 64 increases in volume and the second working chamber 66 decreases in volume during a compression stroke. Because the piston 36 is a closed piston 36, there is no fluid flow directly between the first and second working chambers 64, 66. Instead, the increasing volume of the first working chamber 64 is filled by fluid that flows from the reserve tube chamber 54 and flows into the first working chamber 64 via the slots in the rod guide assembly 74 where the rod guide assembly 74 meets the first pressure tube end 56. Fluid is supplied to the reserve tube chamber 54 by the second hydraulic line 28. This fluid enters the reserve tube chamber 54 via the second damper port 82. Fluid in the second working chamber 66 exits the damper 22 via the first damper port 80 and flows into the first hydraulic line 26. Compression damping is controlled by the first remote valve assembly 24, which controls the flow of fluid into and out of the first and second hydraulic lines 26, 28.

The first remote valve assembly 24 is spaced away from the damper 22. In other words, the first remote valve assembly 24 is not structurally connected to or supported on the damper 22. The only connection between the damper 22 and the first remote valve assembly 24 is via the first and second hydraulic lines 26, 28. Although other configurations are possible, in the illustrated examples, the first and second hydraulic lines 26, 28 are made of flexible tubing, such as rubber tubing, plastic tubing, or braided metal tubing. As a result, there is a great deal of flexibility in where the first remote valve assembly 24 can be mounted relative to the damper 22. This results in packaging benefits and also can make servicing the damper assembly 20 easier with improved access. Furthermore, the first remote valve assembly 24 may be adjacent or in direct physical connection with a remote valve assembly associated with another damper in the suspension system (not shown). Further still, the first remote valve assembly 24 may include a single valve block having components associated with more than one damper in the suspension system. For example, the valve block may be a monolithic part and may include one or more electromagnetic valves associated with the front right damper as well as one or more electromagnetic valves associated with the front left damper. The portion of the single valve block associated with the front right damper may be hydraulically isolated from the part of the single valve block associated with the front left damper. Alternatively, there may be a passage hydraulically interconnecting the portion associated with the front right damper to the portion associated with the front left damper.

Figure 6:
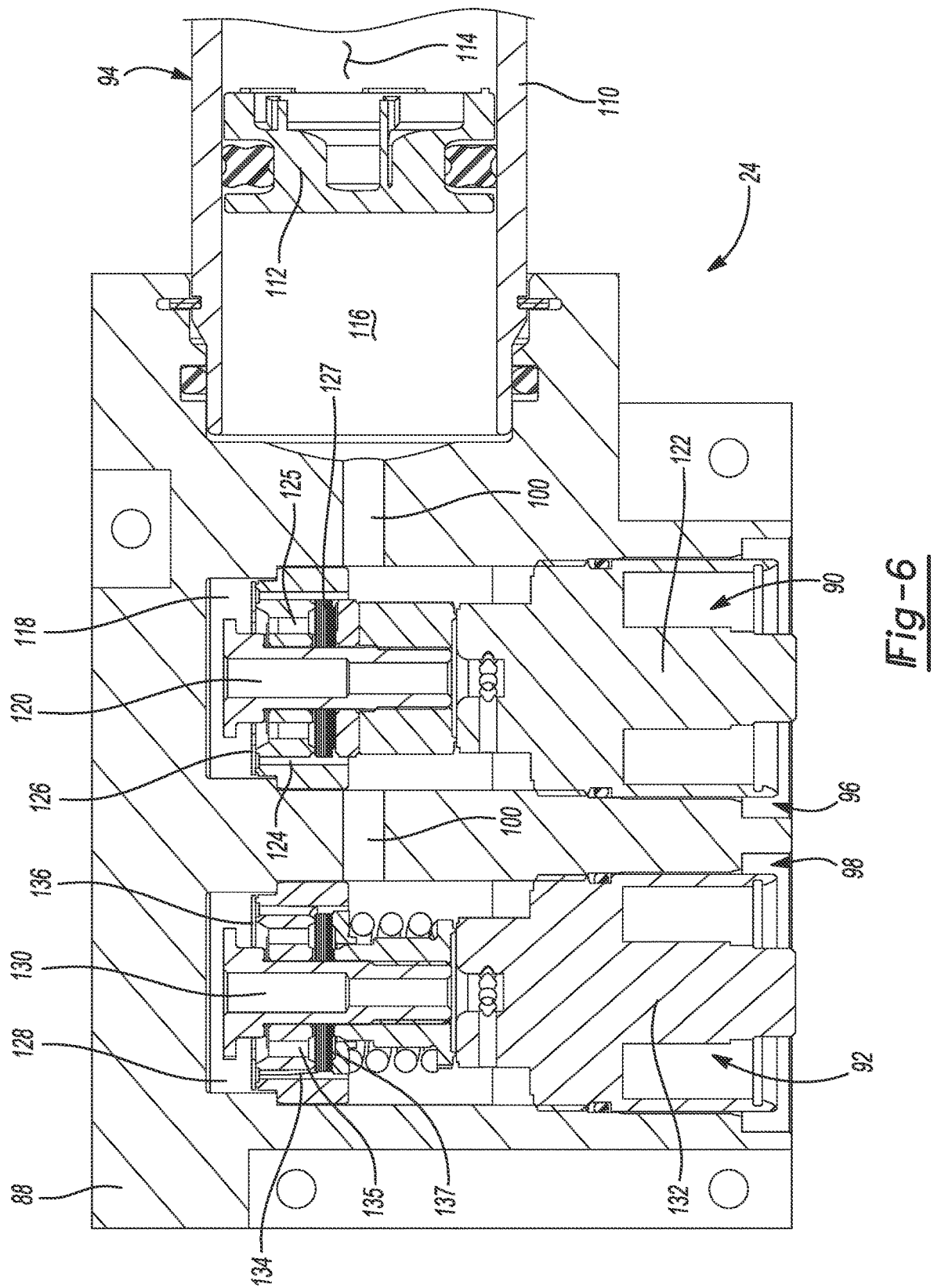
FIG. 6 is a front cross-section view of an exemplary remote valve assembly of the damper assembly illustrated in FIG. 1.

With additional reference to FIG. 6, the first remote valve assembly 24 includes a first valve block 88, a first electromagnetic valve 90, a second electromagnetic valve 92, and an accumulator 94. The first valve block 88 includes a first valve bore 96 that is configured to receive the first electromagnetic valve 90 and a second valve bore 98 that is configured to receive the second electromagnetic valve 92. The first valve block 88 also has a common valve passageway 100 that extends between the first and second valve bores 96, 98 and the accumulator 94. The first valve block 88 further includes a first remote valve port 102 that extends through the first valve block 88 to the first valve bore 96 and a second remote valve port 104 that extends through the first valve block 88 to the second valve bore 98. The first hydraulic line 26 is connected to the first remote valve port 102 by a first valve assembly fitting 106 and the second hydraulic line 28 is connected to the second remote valve port 104 by a second valve assembly fitting 108.

The accumulator 94 has an accumulator housing 110 and a floating piston 112 that is arranged in sliding engagement inside the accumulator housing 110. The floating piston 112 divides the accumulator 94 into a pressurized gas chamber 114 and an accumulation chamber 116 that is arranged in fluid communication with the common valve passageway 100. When fluid flows into the accumulation chamber 116, its volume increases. The volume of the pressurized gas chamber 114 decreases. An increase in the pressure within pressurized gas chamber 114 also occurs. When fluid flows out of the accumulation chamber 116, the volume of the pressurized gas chamber 114 increases and the pressure within the pressurized gas chamber 114 decreases.

Figure 7:
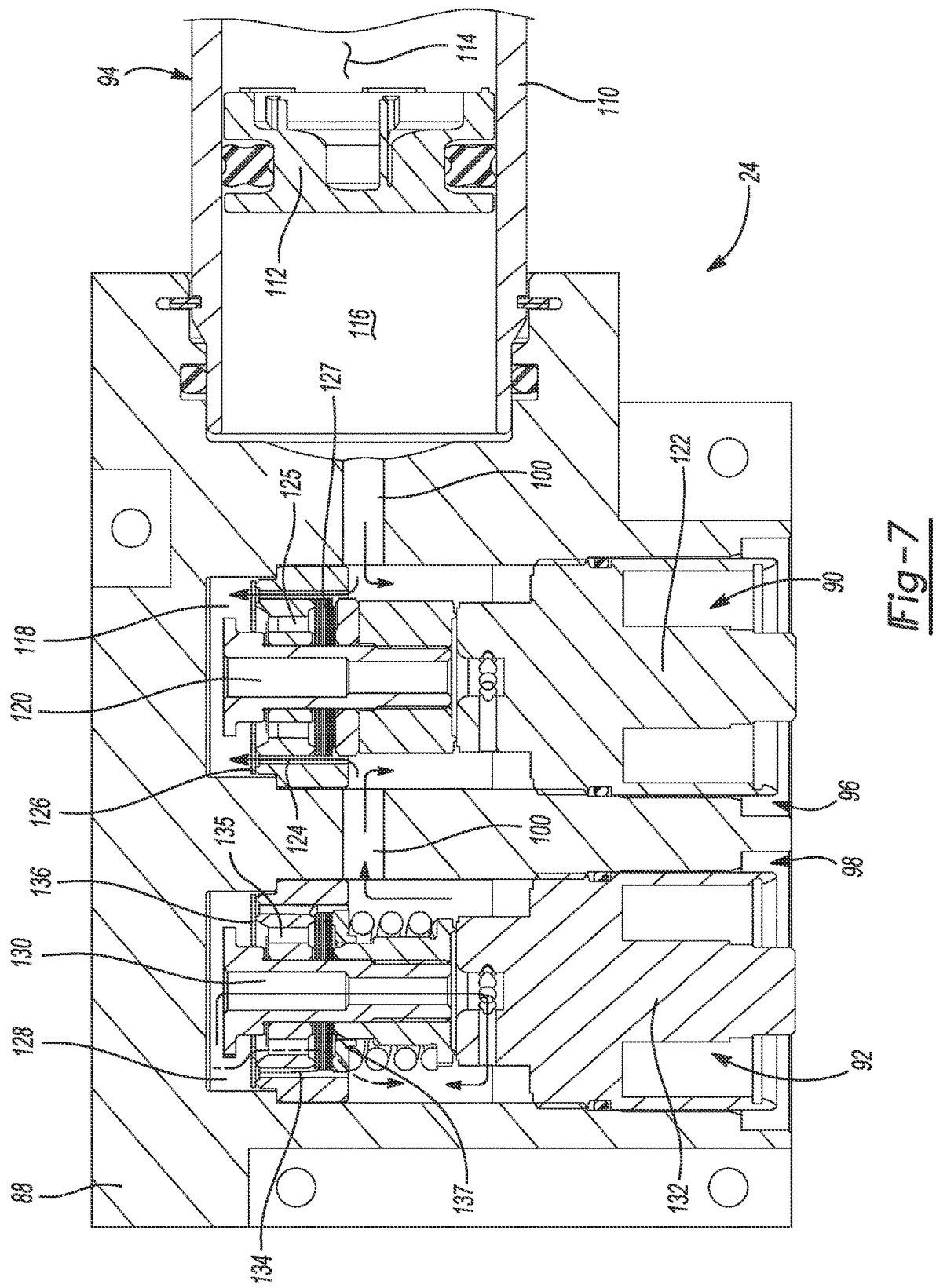
FIG. 7 is another front cross-section view of the exemplary remote valve assembly illustrated in FIG. 6, where the remote valve assembly is shown during an extension (i.e., rebound) stroke.
Figure 8:
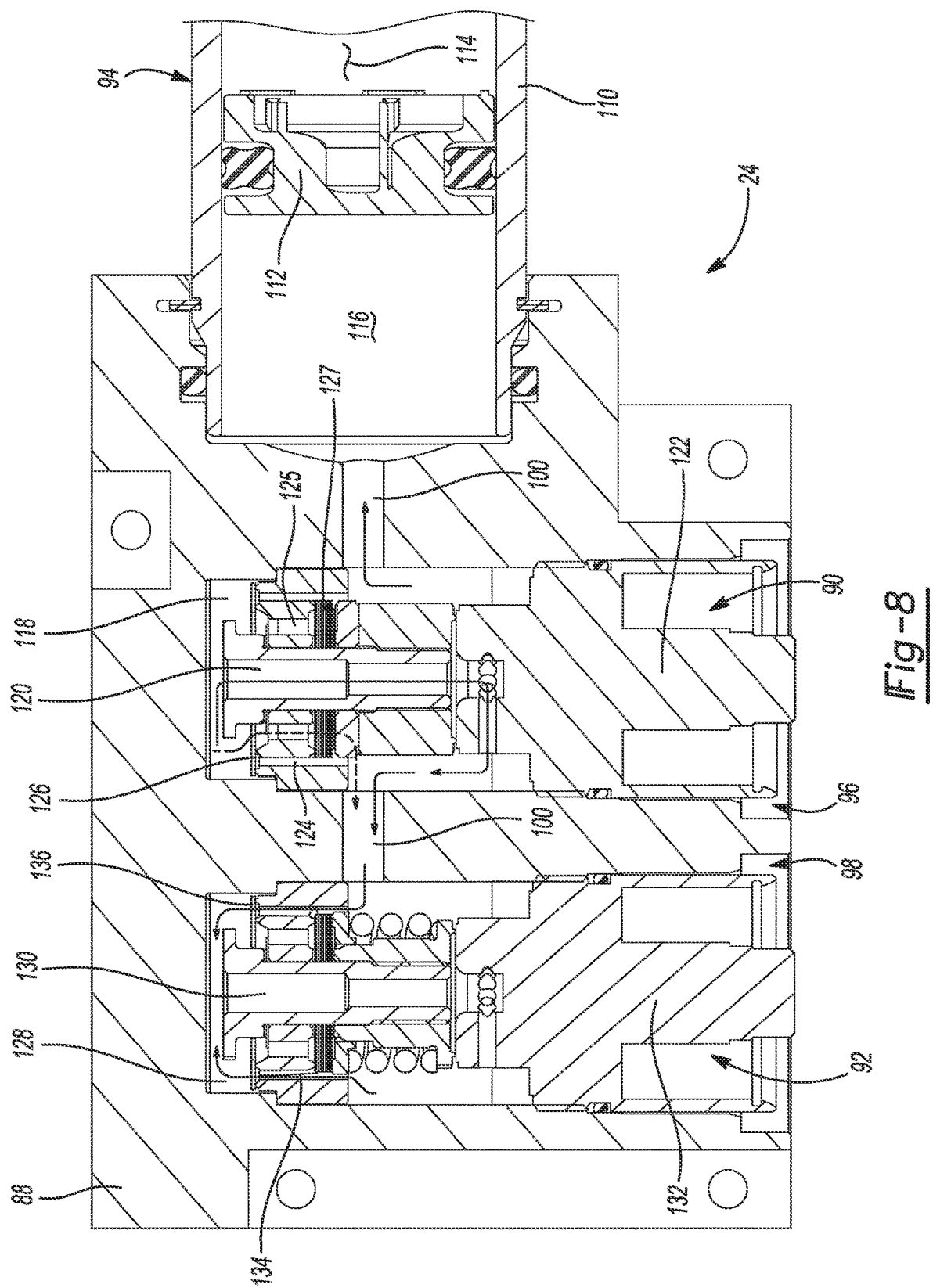
FIG. 8 is another front cross-section view of the exemplary remote valve assembly illustrated in FIG. 6, where the remote valve assembly is shown during a compression stroke.
Figure 9:
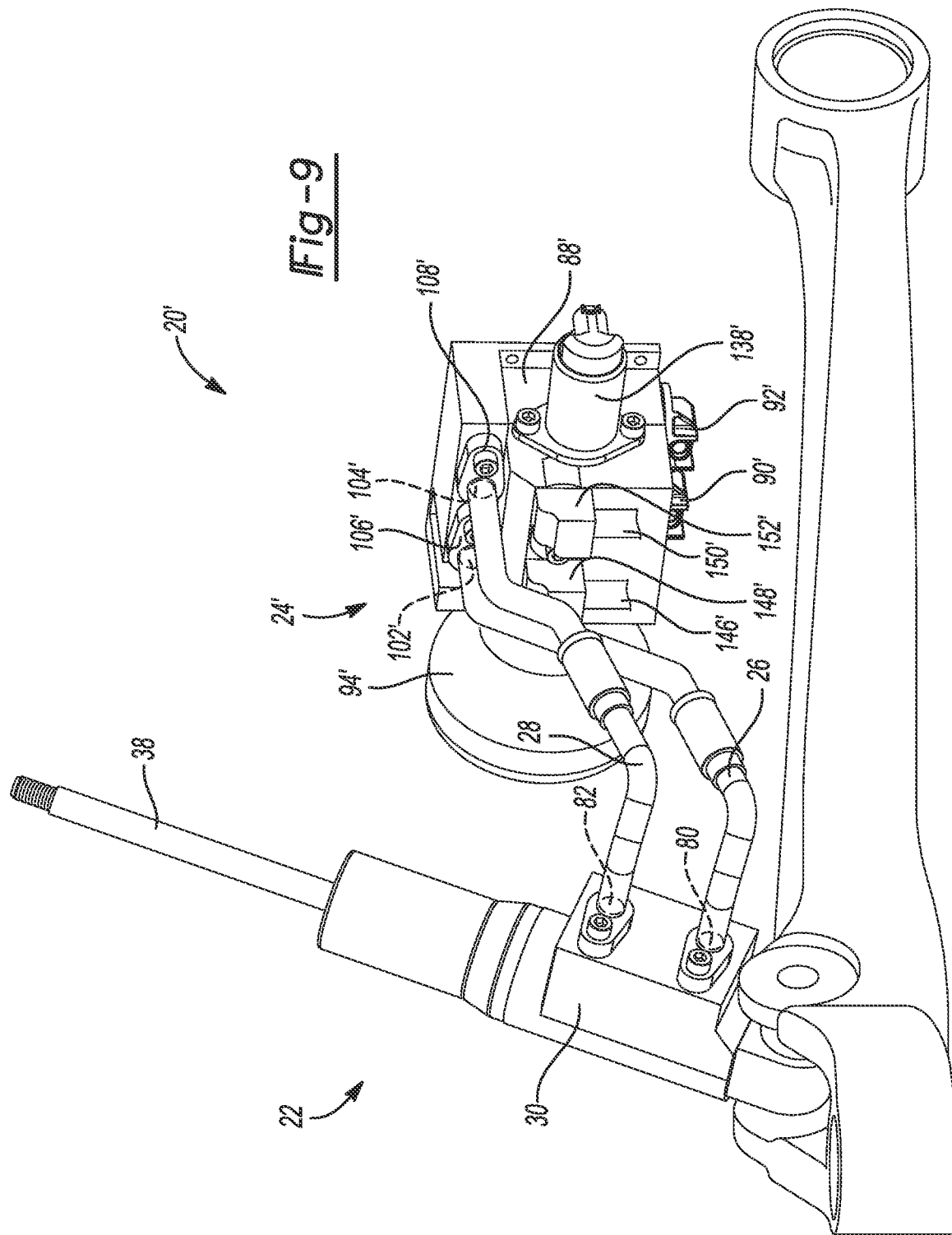
FIG. 9 is a side perspective view of another exemplary damper assembly that is constructed in accordance with the teachings of the present disclosure.
Figure 10:
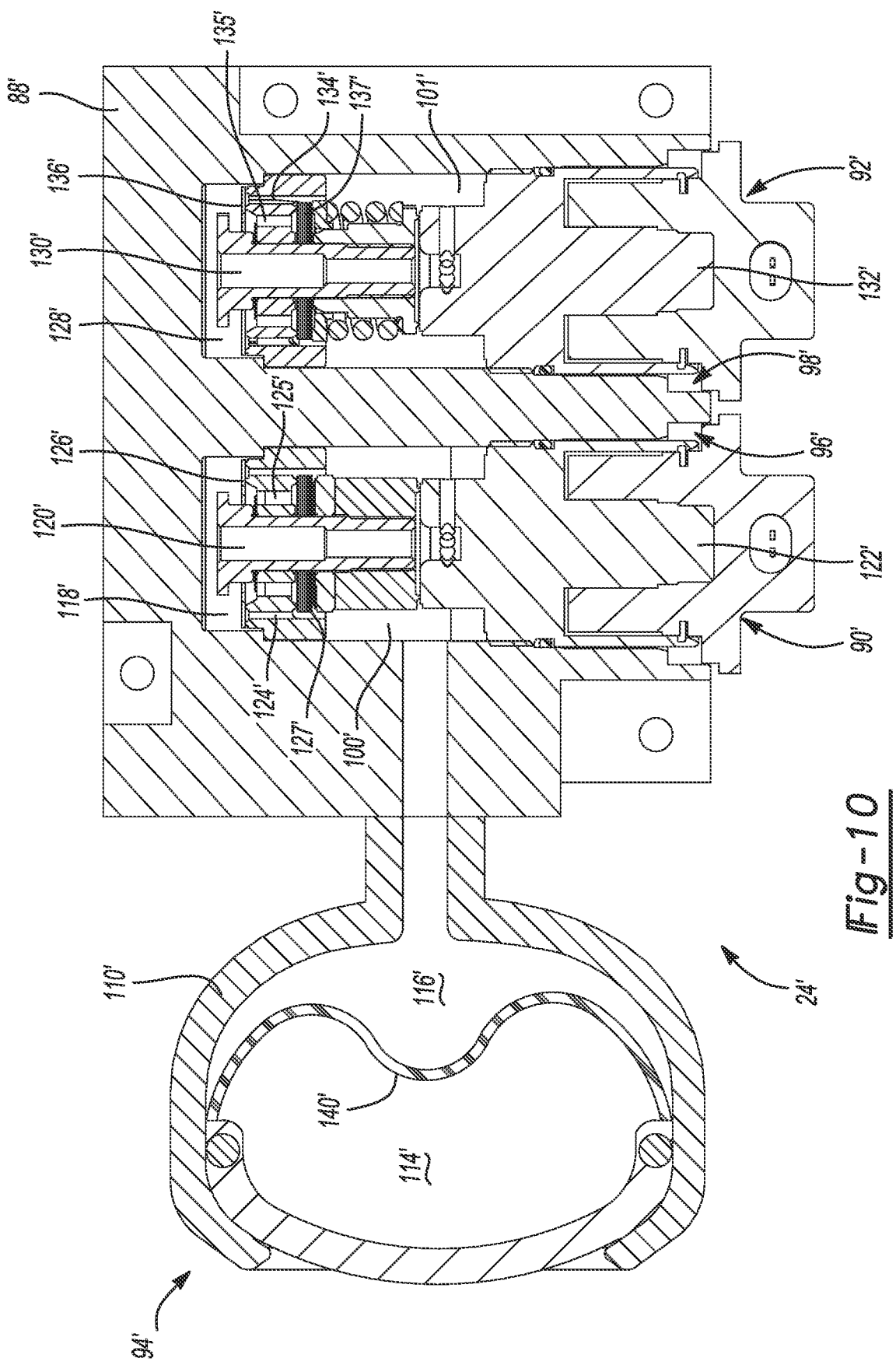
FIG. 10 is a front cross-section view of another exemplary remote valve assembly of the damper assembly illustrated in FIG. 9.
Figure 11:
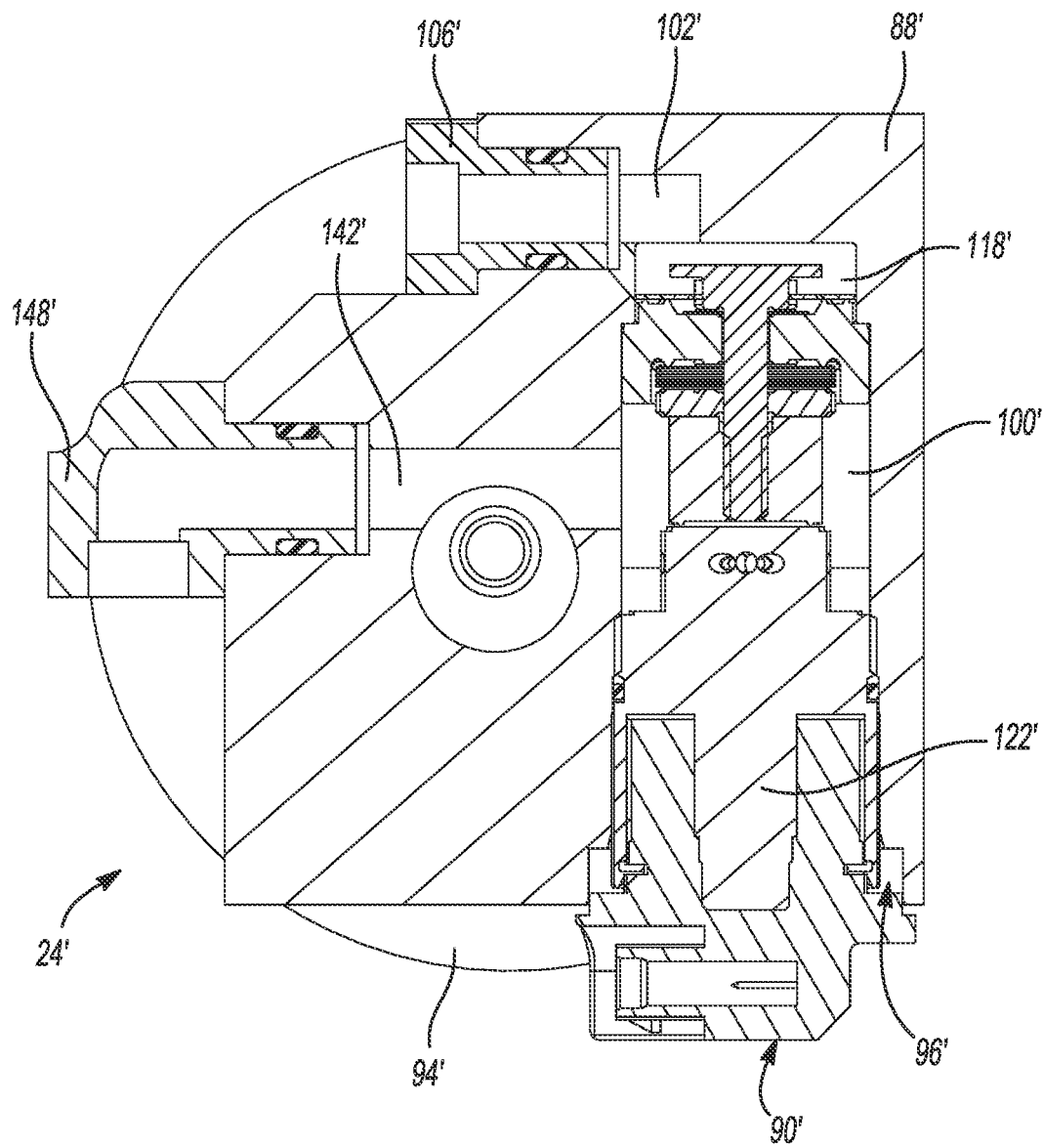
FIG. 11 is a side cross-section view of the exemplary remote valve assembly illustrated in FIG. 10.
Figure 12:
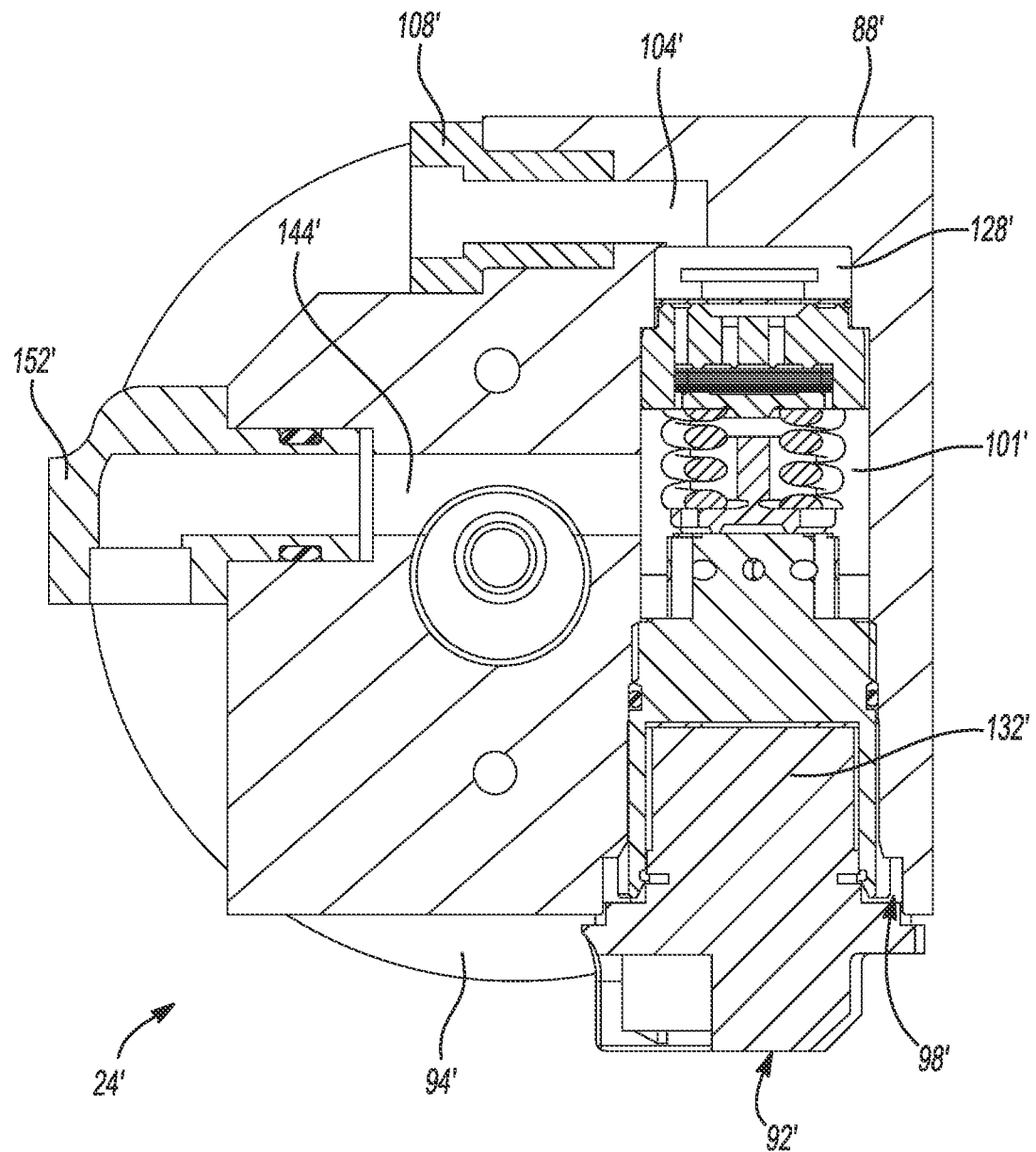
FIG. 12 is another side cross-section view of the exemplary remote valve assembly illustrated in FIG. 10.
Figure 13:
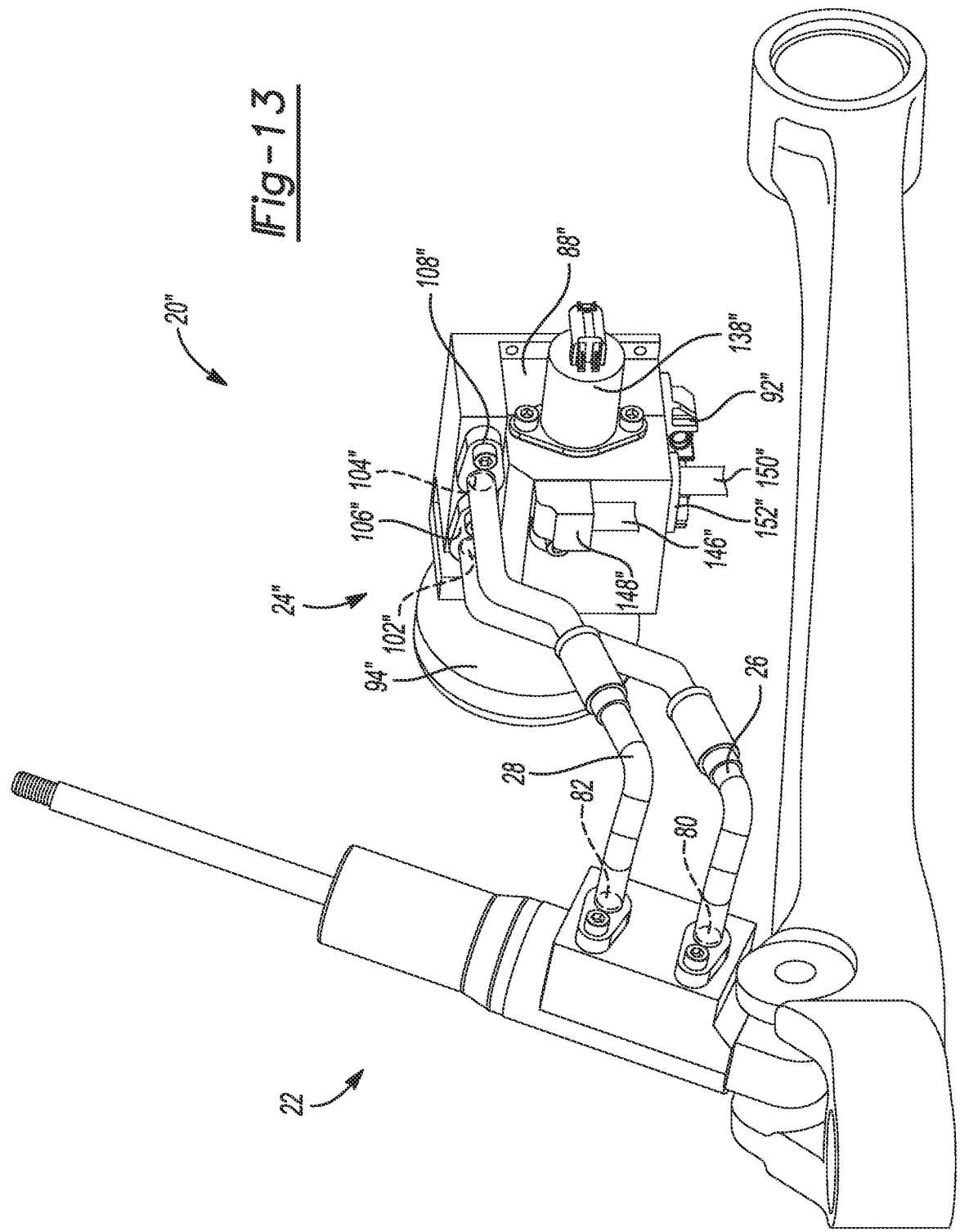
FIG. 13 is a side perspective view of another exemplary damper assembly that is constructed in accordance with the teachings of the present disclosure.
Figure 14:
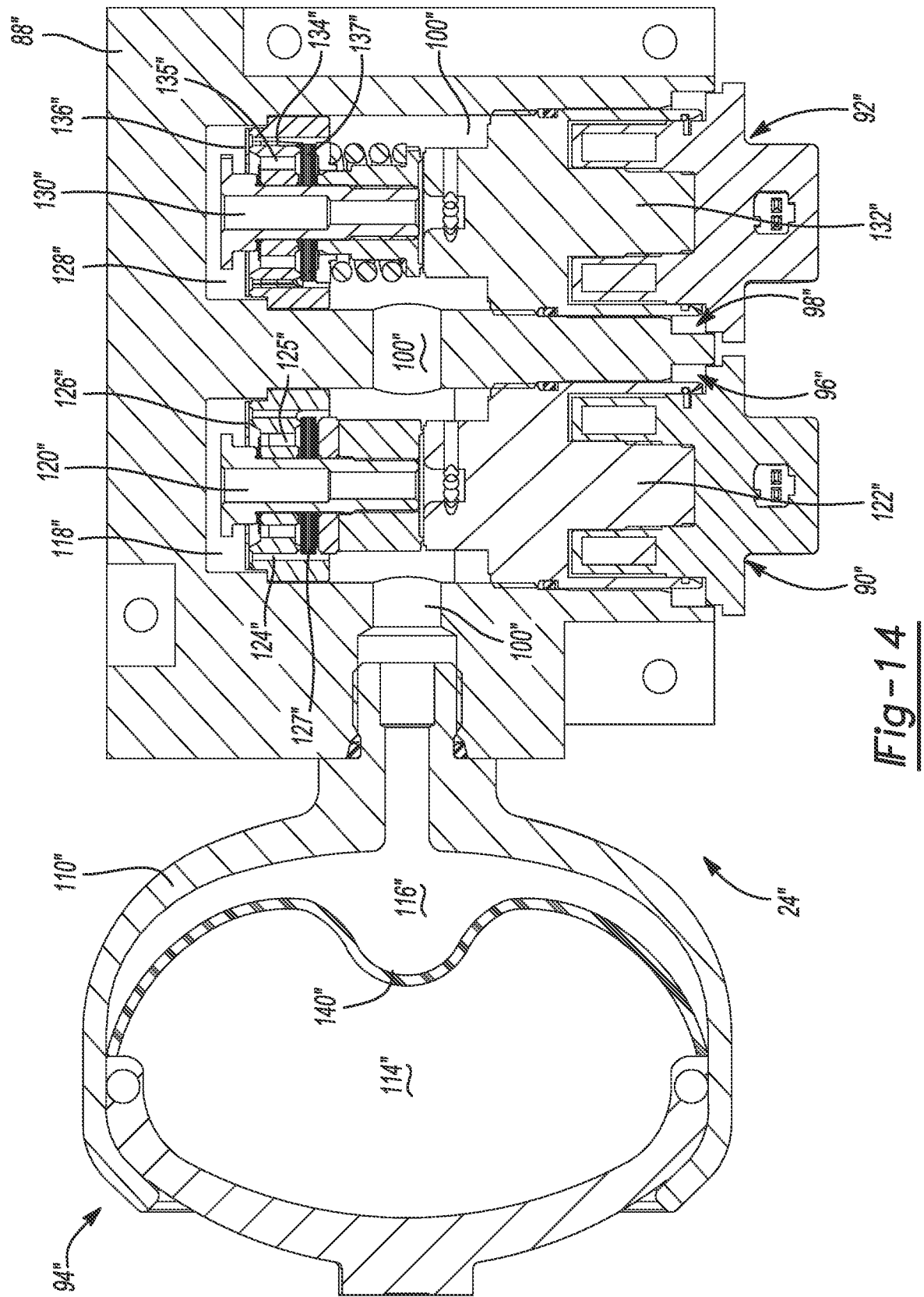
FIG. 14 is a front cross-section view of another exemplary remote valve assembly of the damper assembly illustrated in FIG. 13.
Figure 15:
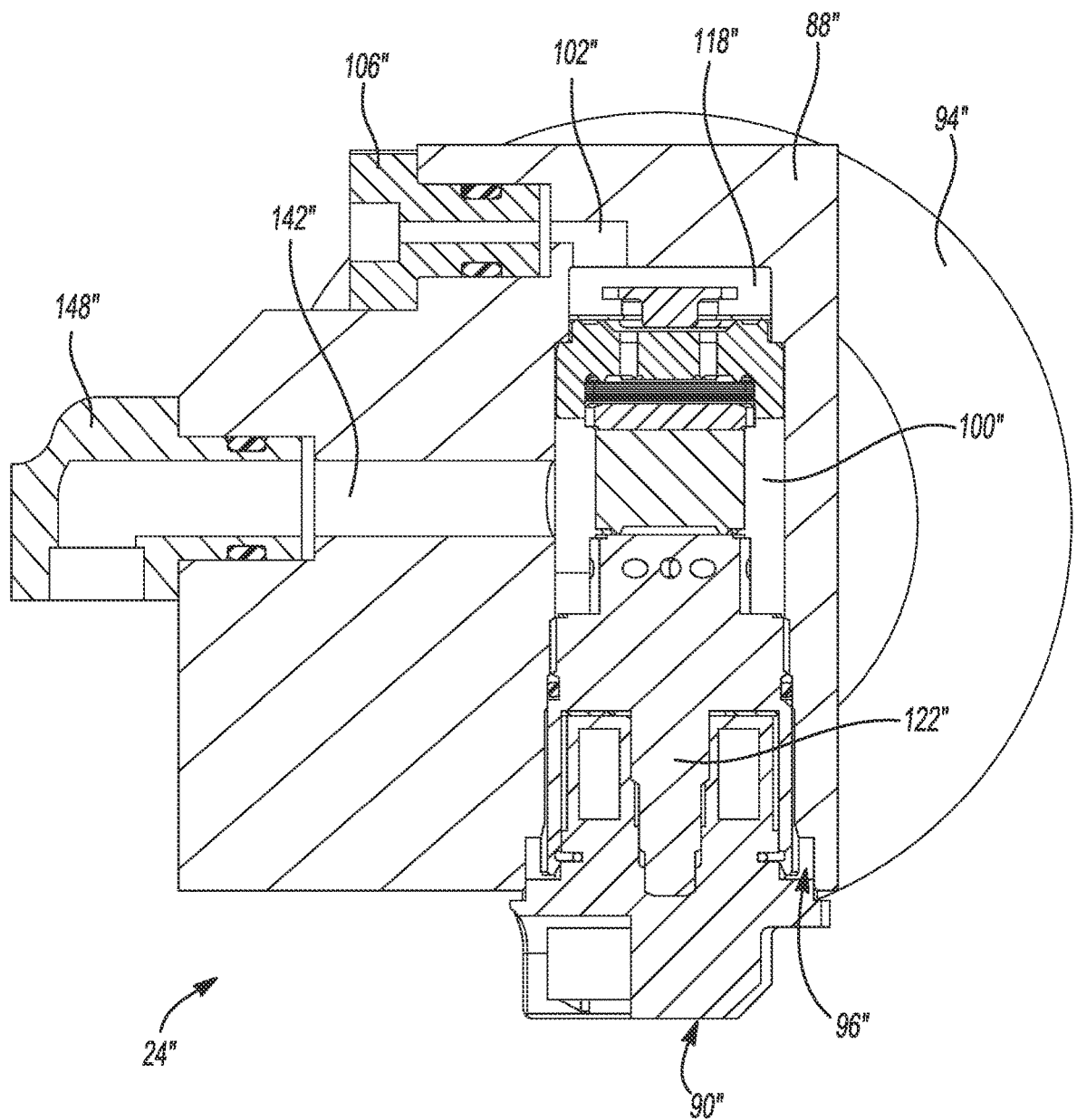
FIG. 15 is a side cross-section view of the exemplary remote valve assembly illustrated in FIG. 14.
Figure 16:
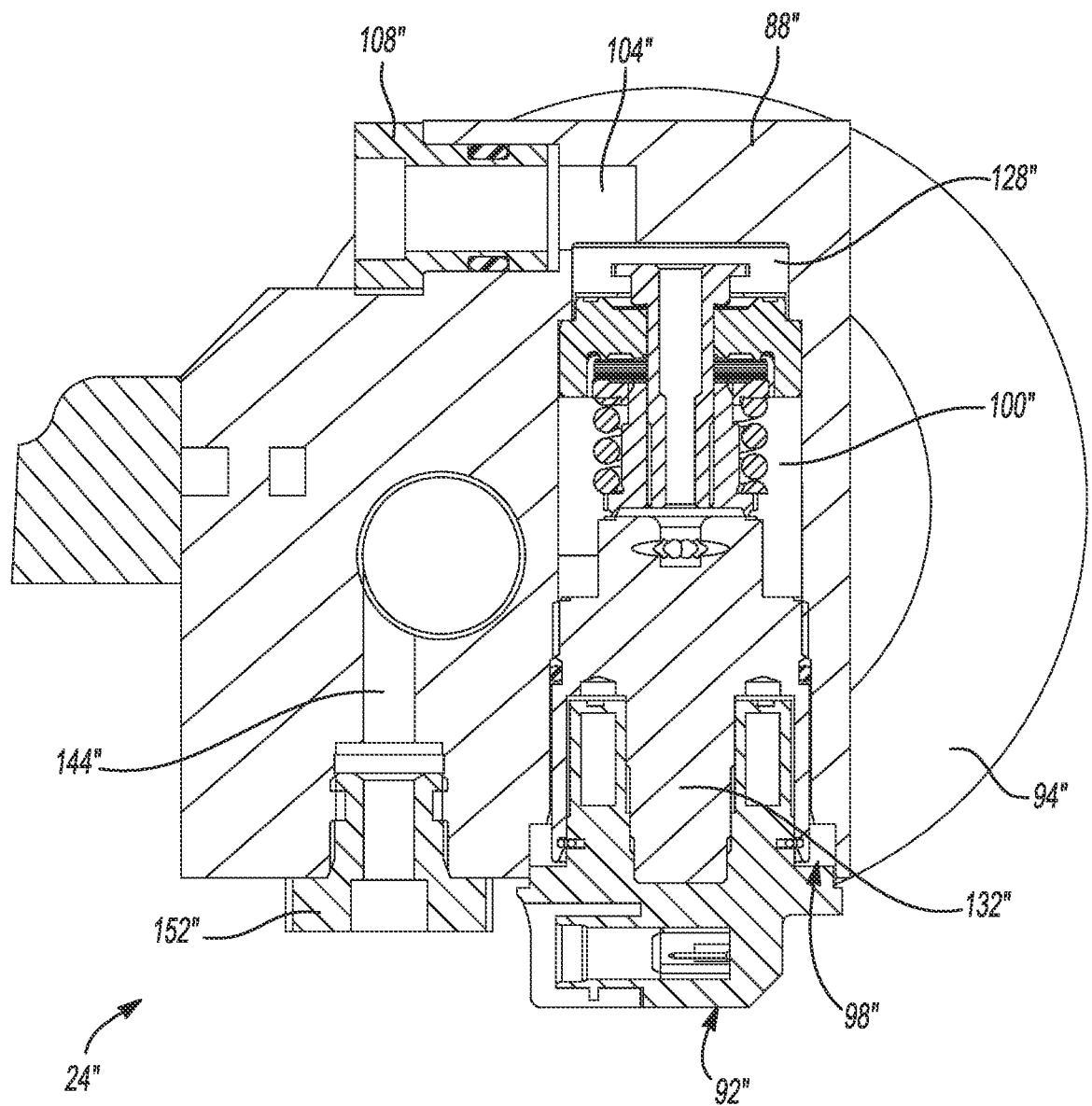
FIG. 16 is another side cross-section view of the exemplary remote valve assembly illustrated in FIG. 14.

The first valve bore 96 in the first valve block 88 includes a first transfer chamber 118 that is arranged in fluid communication with the first remote valve port 102. As shown in FIG. 7, fluid in the first transfer chamber 118 enters the first hydraulic line 26 during a rebound stoke after flowing from the common valve passageway 100 to the first transfer chamber 118 via a first passive orifice 124 in the first electromagnetic valve 90. Fluid flow through the first passive orifice 124 in the first electromagnetic valve 90 is controlled by a first spring-disc stack 126, which flexes to an open position when the pressure differential between the common valve passageway 100 and the first transfer chamber 118 exceeds a predetermined pressure. As shown in FIG. 8, fluid in the first hydraulic line 26 enters the first transfer chamber 118 during a compression stroke and flows into the common valve passageway 100 via a first active orifice 120 in the first electromagnetic valve 90. The first electromagnetic valve 90 includes a first solenoid 122 that is configured to open and close the first active orifice 120 in response to the application of electric current to the first solenoid 122. A secondary fluid flow path shown in dashed lines is also provided during a compression stoke, where fluid in the first transfer chamber 118 can flow to the common valve passageway 100 via a first bypass orifice 125 in the first electromagnetic valve 90 that is controlled by a first passive spring-disc valve 127.

The second valve bore 98 includes a second transfer chamber 128 that is arranged in fluid communication with the second remote valve port 104. As shown in FIG. 7, fluid in the second hydraulic line 28 enters the second transfer chamber 128 during a rebound stroke and flows into the common valve passageway 100 via a second active orifice 130 in the second electromagnetic valve 92. The second electromagnetic valve 92 includes a second solenoid 132 that is configured to open and close the second active orifice 130 in response to the application of electric current to the second solenoid 132. A secondary fluid flow path shown in dashed lines is also provided during a rebound stoke, where fluid in the second transfer chamber 128 can flow to the common valve passageway 100 via a second bypass orifice 135 in the second electromagnetic valve 92 that is controlled by a second passive spring-disc valve 137. As shown in FIG. 8, fluid in the second transfer chamber 128 enters the second hydraulic line 28 during a compression stoke after flowing from the common valve passageway 100 to the second transfer chamber 128 via a second passive orifice 134 in the second electromagnetic valve 92. Fluid flow through the second passive orifice 134 in the second electromagnetic valve 92 is controlled by a second spring-disc stack 136, which flexes to an open position when the pressure differential between the common valve passageway 100 and the second transfer chamber 128 exceeds a predetermined pressure.

With reference to FIGS. 9-12, another damper assembly 20' is illustrated where the damper 22 described above is connected in fluid communication with a second remote valve assembly 24'. The structure of the damper 22 and the first and second hydraulic lines 26, 28 is unchanged from that described above. Only the second remote valve assembly 24' is different. The second remote valve assembly 24' includes a second valve block 88', a first electromagnetic valve 90', a second electromagnetic valve 92', an accumulator 94', and a switch valve 138'. The second valve block 88' has a first valve bore 96' that is configured to receive the first electromagnetic valve 90' and a second valve bore 98' that is configured to receive the second electromagnetic valve 92'. A first remote valve port 102' extends through the second valve block 88' to the first valve bore 96' and a second remote valve port 104' extends through the second valve block 88' to the second valve bore 98'. The first remote valve port 102' is configured to connect to a first hydraulic line 26 at a first valve assembly fitting 106' and the second remote valve port 104' is configured to connect to a second hydraulic line 28 at a second valve assembly fitting 108'. Like in the design described above, the first hydraulic line 26 is connected to the first damper port 80 and the second hydraulic line 28 is connected to the second damper port 82. The accumulator 94' has an accumulator housing 110' and a flexible diaphragm 140' arranged inside the accumulator housing 110' that divides the accumulator 94' into a pressurized gas chamber 114' and an accumulation chamber 116' that is arranged in fluid communication with the first electromagnetic valve 90', but not the second electromagnetic valve 92'.

The first valve bore 96' in the second valve block 88' includes a first transfer chamber 118' that is arranged in fluid communication with the first remote valve port 102'. Fluid in the first hydraulic line 26 enters the first transfer chamber 118' during a compression stroke and flows into a first valve passageway 100' via a first active orifice 120' in the first electromagnetic valve 90'. The first electromagnetic valve 90' includes a first solenoid 122' that is configured to open and close the first active orifice 120' in response to the application of electric current to the first solenoid 122'. During a compression stoke, fluid in the first transfer chamber 118 can also flow to the first valve passageway 100' via a first bypass orifice 125' in the first electromagnetic valve 90' that is controlled by a first passive spring-disc valve 127'. Fluid in the first transfer chamber 118' enters the first hydraulic line 26 during a rebound stoke after flowing from the first valve passageway 100' to the first transfer chamber 118' via a first passive orifice 124' in the first electromagnetic valve 90'. Fluid flow through the first passive orifice 124' in the first electromagnetic valve 90' is controlled by a first spring-disc stack 126', which flexes to an open position when the pressure differential between the first valve passageway 100' and the first transfer chamber 118' exceeds a predetermined pressure.

The second valve bore 98' in the second valve block 88' includes a second transfer chamber 128' that is arranged in fluid communication with the second remote valve port 104'. Fluid in the second hydraulic line 28 enters the second transfer chamber 128' during a rebound stroke and flows into a second valve passageway 101' via a second active orifice 130' in the second electromagnetic valve 92'. The second electromagnetic valve 92' includes a second solenoid 132' that is configured to open and close the second active orifice 130' in response to the application of electric current to the second solenoid 132'. A secondary fluid flow path shown in dashed lines is also provided during a rebound stoke, where fluid in the second transfer chamber 128' can flow to the second valve passageway 101' via a second bypass orifice 135' in the second electromagnetic valve 92' that is controlled by a second passive spring-disc valve 137'. Fluid in the second transfer chamber 128' enters the second hydraulic line 28 during a compression stoke after flowing from the second valve passageway 101' to the second transfer chamber 128' via a second passive orifice 134' in the second electromagnetic valve 92'. Fluid flow through the second passive orifice 134' in the second electromagnetic valve 92' is controlled by a second spring-disc stack 136', which flexes to an open position when the pressure differential between the second valve passageway 101' and the second transfer chamber 128' exceeds a predetermined pressure.

The second remote valve assembly 24' also has a third remote valve port 142' that extends through the second valve block 88' to the first valve passageway 100' and a fourth remote valve port 144' that extends through the second valve block 88' to the second valve passageway 101'. The third remote valve port 142' is configured to connect to a third hydraulic line 146' at a third valve assembly fitting 148' and the fourth remote valve port 144' is configured to connect to a fourth hydraulic line 150' at a fourth valve assembly fitting 152'. As a result, fluid can enter and exit the first and second valve passageways 100', 101' via the third and fourth hydraulic lines 146', 150', respectively. The switch valve 138' has a first position where the switch valve 138' opens a fluid connection between the first and second valve bores 96', 98' and a second position where the switch valve 138' closes the fluid connection between the first and second valve bores 96', 98'.

The third and fourth hydraulic lines 146', 150' are configured to connect to a remote valve assembly associated with another damper in the suspension system (not shown). For example, the damper assembly 20' shown in FIG. 9 includes a front left damper 22. The third and fourth hydraulic lines 146', 150' in this example would run to the remote valve assembly of the front right damper (not shown). In accordance with this arrangement, the third hydraulic line 146' is connected in fluid communication with the first electromagnetic valve 90' in the remote valve assembly 24' associated with the front left damper 22 and is connected in fluid communication with the second electromagnetic valve in the remote valve assembly associated with the front right damper. The fourth hydraulic line 150' is connected in fluid communication with the second electromagnetic valve 92' in the remote valve assembly 24' associated with the front left damper 22 and is connected in fluid communication with the first electromagnetic valve in the remote valve assembly associated with the front right damper. Because the third and fourth hydraulic lines 146', 150' cross, passive fluid pressure in the third and fourth hydraulic lines 146', 150' can be transferred from the front left damper 22 to the front right damper and vice versa to provide anti-roll resistance when the vehicle is cornering. Anti-roll resistance is optimized when the switch valve 138' is in the second position, while ride comfort is optimized when the switch valve 138' is in the first position. The third and fourth hydraulic lines 146', 150' may also connect to the hydraulic lines associated with the back left and back right dampers of the vehicle by T connections (not shown).

The second remote valve assembly 24' may be adjacent or in direct physical connection with a remote valve assembly associated with another damper in the suspension system (not shown). Alternatively, the second remote valve assembly 24' may include a single valve block having components associated with more than one damper in the suspension system. For example, the valve block may be a monolithic part and may include one or more electromagnetic valves associated with the front right damper as well as one or more electromagnetic valves associated with the front left damper. The portion of the single valve block associated with the front right damper may be hydraulically isolated from the part of the single valve block associated with the front left damper. Alternatively, there may be a passage hydraulically interconnecting the portion associated with the front right damper to the portion associated with the front left damper.

With reference to FIGS. 13-16, another damper assembly 20" is illustrated where the damper 22 described above is connected in fluid communication with a third remote valve assembly 24". The structure of the damper 22 and the first and second hydraulic lines 26, 28 is unchanged from that described above. Only the third remote valve assembly 24" is different. The third remote valve assembly 24" includes a third valve block 88", a first electromagnetic valve 90", a second electromagnetic valve 92", an accumulator 94", and a switch valve 138". The third valve block 88" has a first valve bore 96" that is configured to receive the first electromagnetic valve 90" and a second valve bore 98" that is configured to receive the second electromagnetic valve 92". The third valve block 88" also includes a common valve passageway 100" that extends between the first and second valve bores 96", 98" and the accumulator 94". The accumulator 94" has an accumulator housing 110" and a flexible diaphragm 140" arranged inside the accumulator housing 110" that divides the accumulator 94" into a pressurized gas chamber 114" and an accumulation chamber 116" that is arranged in fluid communication with the common valve passageway 100".

The third remote valve assembly 24" also includes a first remote valve port 102" that extends through the third valve block 88" to the first valve bore 96" and a second remote valve port 104" that extends through the third valve block 88" to the second valve bore 98". The first remote valve port 102" is configured to connect to the first hydraulic line 26 at a first valve assembly fitting 106" and the second remote valve port 104" is configured to connect to the second hydraulic line 28 at a second valve assembly fitting 108".

The first valve bore 96" in the third valve block 88" includes a first transfer chamber 118" that is arranged in fluid communication with the first remote valve port 102". Fluid in the first hydraulic line 26 enters the first transfer chamber 118" during a compression stroke and flows into the common valve passageway 100" via a first active orifice 120" in the first electromagnetic valve 90". The first electromagnetic valve 90" includes a first solenoid 122" that is configured to open and close the first active orifice 120" in response to the application of electric current to the first solenoid 122". A secondary fluid flow path shown in dashed lines is also provided during a compression stoke, where fluid in the first transfer chamber 118" can flow to the common valve passageway 100" via a first bypass orifice 125" in the first electromagnetic valve 90" that is controlled by a first passive spring-disc valve 127". Fluid in the first transfer chamber 118" enters the first hydraulic line 26 during a rebound stoke after flowing from the common valve passageway 100" to the first transfer chamber 118" via a first passive orifice 124" in the first electromagnetic valve 90". Fluid flow through the first passive orifice 124" in the first electromagnetic valve 90" is controlled by a first spring-disc stack 126", which flexes to an open position when the pressure differential between the common valve passageway 100" and the first transfer chamber 118" exceeds a predetermined pressure.

The second valve bore 98" includes a second transfer chamber 128" that is arranged in fluid communication with the second remote valve port 104". Fluid in the second hydraulic line 28 enters the second transfer chamber 128" during a rebound stroke and flows into the common valve passageway 100" via a second active orifice 130" in the second electromagnetic valve 92". The second electromagnetic valve 92" includes a second solenoid 132" that is configured to open and close the second active orifice 130" in response to the application of electric current to the second solenoid 132". A secondary fluid flow path shown in dashed lines is also provided during a round stoke, where fluid in the second transfer chamber 128" can flow to the common valve passageway 100" via a second bypass orifice 135" in the second electromagnetic valve 92" that is controlled by a second passive spring-disc valve 137". Fluid in the second transfer chamber 128" enters the second hydraulic line 28 during a compression stoke after flowing from the common valve passageway 100" to the second transfer chamber 128" via a second passive orifice 134" in the second electromagnetic valve 92". Fluid flow through the second passive orifice 134" in the second electromagnetic valve 92" is controlled by a second spring-disc stack 136", which flexes to an open position when the pressure differential between the common valve passageway 100" and the second transfer chamber 128" exceeds a predetermined pressure.

The third remote valve assembly 24" has a third remote valve port 142" that is arranged in fluid communication with the common valve passageway 100" and a fourth remote valve port 144" that is arranged in fluid communication with either the first transfer chamber 118" or the second transfer chamber 128" depending on a position of the switch valve 138". The switch valve 138" of the third remote valve assembly 24" has a first position where the switch valve 138" connects the fourth remote valve port 144" in fluid communication with the first transfer chamber 118" and a second position where the switch valve 138" connects the fourth remote valve port 144" in fluid communication with the second transfer chamber 128". The third remote valve port 142" is configured to connect to a third hydraulic line 146" at a third valve assembly fitting 148" and the fourth remote valve port 144" is configured to connect to a fourth hydraulic line 150" at a fourth valve assembly fitting 152". The third hydraulic line 146" is configured to be connected to a reservoir (not shown) and the fourth hydraulic line 150" is configured to be connected to a pump (not shown). In accordance with this arrangement, the pump can be used to increase fluid pressure in either the first hydraulic line 26 or the second hydraulic line 28 and thus the first working chamber 64 or the second working chamber 66. Operation of the pump in conjunction with the switch valve 138" therefore can be used to provide active anti-roll resistance and/or to raise or lower the ride height of the vehicle.

The third remote valve assembly 24" may be adjacent or in direct physical connection with a remote valve assembly associated with another damper in the suspension system (not shown). Alternatively, the third remote valve assembly 24" may include a single valve block having components associated with more than one damper in the suspension system. For example, the valve block may be a monolithic part and may include one or more electromagnetic valves associated with the front right damper as well as one or more electromagnetic valves associated with the front left damper. The portion of the single valve block associated with the front right damper may be hydraulically isolated from the part of the single valve block associated with the front left damper. Alternatively, there may be a passage hydraulically interconnecting the portion associated with the front right damper to the portion associated with the front left damper.

The first, second, and third remote valve assemblies 24, 24', 24" are interchangeable. As a result, any one of first, second, and third remote valve assemblies 24, 24', 24" can be connected to the damper 22 via the first and second hydraulic lines 26, 28. This interchangeability of the remote valve assemblies 24, 24', 24" allows for different damper assemblies 20, 20', 20" with different operational characteristics to be assembled using one standardized damper 22. The only component that needs to be changed is the remote valve assembly 24, 24', 24". This leads to manufacturing efficiencies that reduce the cost of the damper assemblies 20, 20', 20". In addition, the damper assemblies 20, 20', 20" disclosed herein provide more flexible packaging solutions because the remote valve assembly 24, 24', 24" is spaced from the damper 22 and can therefore be mounted in a wide variety of different locations. This is particularly useful in vehicles with significant packaging constraints in the area where the damper 22 is mounted. It should also be appreciated that the first electromagnetic valves 90, 90', 90", the second electromagnetic valves 92, 92', 92", the accumulators 94, 94', 94", and the switch valves 138', 138" may also be standardized to have the same dimensions and structure such that they could optionally be the same across the three damper assemblies 20, 20', 20".

Many other modifications and variations of the present disclosure are possible in light of the above teachings and may be practiced otherwise than as specifically described while within the scope of the appended claims.

What is claimed is:

1. A damper assembly comprising:
    a pressure tube extending annularly about a damper axis;
    a piston arranged in sliding engagement inside said pressure tube such that said piston divides said pressure tube into a first working chamber and a second working chamber;
    a piston rod extending through said first working chamber and longitudinally along said damper axis between a first piston rod end and a second piston rod end, said second piston rod end coupled to said piston;
    a reserve tube extending annularly about said pressure tube to define a reserve tube chamber radially between said pressure tube and said reserve tube, said pressure tube extending longitudinally between a first pressure tube end and a second pressure tube end, said reserve tube extending longitudinally between a first reserve tube end and a second reserve tube end, said second pressure tube end extending longitudinally beyond said second reserve tube end into a damper body, said reserve tube chamber disposed in fluid communication with said first working chamber;
a first damper port arranged in fluid communication with said second working chamber;
a second damper port arranged in fluid communication with said reserve tube chamber, said first damper port and said second damper port being arranged in the damper body; and
a remote valve assembly spaced away from said pressure tube and said reserve tube, said remote valve assembly including a first electromagnetic valve connected in fluid communication with said first damper port by a first hydraulic line, a second electromagnetic valve connected in fluid communication with said second damper port by a second hydraulic line, and an accumulator connected in fluid communication with at least one of said first and second electromagnetic valves.

2. The damper assembly as set forth in claim 1, wherein said remote valve assembly includes a valve block having a first valve bore that receives said first electromagnetic valve, a second valve bore that receives said second electromagnetic valve, a first remote valve port extending through said valve block to said first valve bore, and a second remote valve port extending through said valve block to said second valve bore.

3. The damper assembly as set forth in claim 2, wherein said first remote valve is connected to said first damper port by said first hydraulic line and said second remote valve port is connected to said second damper port by said second hydraulic line.

4. The damper assembly as set forth in claim 3, wherein said first and second damper ports are arranged in a damper body.

5. The damper assembly as set forth in claim 4, wherein said damper body has a stepped bore with a first stepped segment and a second stepped segment.

6. The damper assembly as set forth in claim 2, further comprising:
a third hydraulic line connected in fluid communication with said first valve bore;
a fourth hydraulic line connected in fluid communication with said second valve bore; and
a switch valve having a first position where said switch valve opens a fluid connection between said first and second valve bores and a second position where said switch valve closes said fluid connection between said first and second valve bores.

7. The damper assembly as set forth in claim 2, further comprising:
a common valve passageway extending through said valve block between said first and second valve bores and said accumulator;
a third hydraulic line connected in fluid communication with said common valve passageway and a reservoir;
a fourth hydraulic line connected in fluid communication with a pump; and
a switch valve having a first position where said switch valve connects said
fourth hydraulic line in fluid communication with said first valve bore and a second position where said switch valve connects said fourth hydraulic line in fluid communication with said second valve bore.

8. The damper assembly as set forth in claim 2, wherein said accumulator has an accumulator housing and a floating piston arranged in sliding engagement inside said accumulator housing such that said floating piston divides said accumulator into a pressurized gas chamber and an accumulation chamber that is arranged in fluid communication with at least one of said first and second electromagnetic valves.

9. The damper assembly as set forth in claim 2, wherein said accumulator has an accumulator housing and a flexible diaphragm arranged inside said accumulator housing that divides said accumulator into an accumulation chamber that is arranged in fluid communication with a pressurized gas chamber and at least one of said first and second electromagnetic valves.

10. The damper assembly as set forth in claim 2, wherein said first valve bore includes a first transfer chamber that is arranged in fluid communication with said first remote valve port such that fluid in said first hydraulic line enters said first transfer chamber during a compression stroke and flows through a first active orifice in said first electromagnetic valve and such that fluid in said first transfer chamber enters said first hydraulic line during a rebound stoke after flowing to said first transfer chamber via a first passive orifice in said first electromagnetic valve.

11. The damper assembly as set forth in claim 2, wherein said second valve bore includes a second transfer chamber that is arranged in fluid communication with said second remote valve port such that fluid in said second hydraulic line enters said second transfer chamber during a rebound stroke and flows through a second active orifice in said second electromagnetic valve and such that fluid in said second transfer chamber enters said second hydraulic line during a compression stoke after flowing to said second transfer chamber via a second passive orifice in said second electromagnetic valve.

12. The damper assembly as set forth in claim 1, wherein said second pressure tube end is received in said first stepped segment of said stepped bore in said damper body and said second reserve tube end is received in said second stepped segment of said stepped bore in said damper body.

13. The damper assembly as set forth in claim 12, wherein said first damper port extends through said damper body to said first stepped segment of said stepped bore and said second damper port extends through said damper body to said second stepped segment of said stepped bore.

14. The damper assembly as set forth in claim 1, wherein said piston is a closed piston that lacks passageways for communicating fluid between said first and second working chambers.

15. A damper assembly comprising:
a damper body having a stepped bore with a first stepped segment and a second stepped segment;
a pressure tube extending annularly about a damper axis and longitudinally between a first pressure tube end and a second pressure tube end;
a piston arranged in sliding engagement inside said pressure tube such that said piston divides said pressure tube into a first working chamber and a second working chamber;
a piston rod extending through said first working chamber and longitudinally along said damper axis between a first piston rod end and a second piston rod end, said second piston rod end coupled to said piston;
a reserve tube extending annularly about said pressure tube to define a reserve tube chamber radially between said pressure tube and said reserve tube, said reserve tube extending longitudinally between a first reserve tube end and a second reserve tube end, said reserve tube chamber disposed in fluid communication with said first working chamber;

said second pressure tube end received in said first stepped segment of said stepped bore in said damper body and said second reserve tube end received in said second stepped segment of said stepped bore in said damper body;

said damper body including a first damper port extending through said damper body to said first stepped segment of said stepped bore and arranged in fluid communication with said second working chamber and a second damper port extending through said damper body to said second stepped segment of said stepped bore and arranged in fluid communication with said reserve tube chamber; and a remote valve assembly spaced away from said damper body, said remote valve assembly including a first electromagnetic valve, a second electromagnetic valve, an accumulator, and a valve block having a first valve bore that receives said first electromagnetic valve, a second valve bore that receives said second electromagnetic valve, a passageway extending through said valve block between at least one of said first and second valve bores and said accumulator, a first remote valve port extending through said valve block to said first valve bore, and a second remote valve port extending through said valve block to said second valve bore, wherein said first remote valve port is connected to said first damper port by a first hydraulic line and said second remote valve port is connected to said second damper port by a second hydraulic line.

16. The damper assembly as set forth in claim 15, wherein said first valve bore includes a first transfer chamber that is arranged in fluid communication with said first remote valve port such that fluid in said first hydraulic line enters said first transfer chamber during a compression stroke and flows through a first active orifice in said first electromagnetic valve and such that fluid in said first transfer chamber enters said first hydraulic line during a rebound stoke after flowing to said first transfer chamber via a first passive orifice in said first electromagnetic valve.

17. The damper assembly as set forth in claim 15, wherein said second valve bore includes a second transfer chamber that is arranged in fluid communication with said second remote valve port such that fluid in said second hydraulic line enters said second transfer chamber during a rebound stroke and flows through a second active orifice in said second electromagnetic valve and such that fluid in said second transfer chamber enters said second hydraulic line during a compression stoke after flowing to said second transfer chamber via a second passive orifice in said second electromagnetic valve.

18. The damper assembly as set forth in claim 15, wherein said first and second hydraulic lines are made of flexible tubing.

19. A damper assembly comprising:
a damper including a pressure tube, a piston arranged in sliding engagement inside said pressure tube to define first and second working chambers, a piston rod coupled to said piston, and a reserve tube extending annularly about said pressure tube to define a reserve tube chamber between said pressure tube and said reserve tube, said reserve tube chamber disposed in fluid communication with said first working chamber;
a first damper port arranged in fluid communication with said second working chamber;
a second damper port arranged in fluid communication with said reserve tube chamber;
a first hydraulic line connected in fluid communication with said first damper port;
a second hydraulic line connected in fluid communication with said second damper port;
first and second electromagnetic valves;
an accumulator;
a first remote valve assembly including a first valve block having a first valve bore configured to receive said first electromagnetic valve, a second valve bore configured to receive said second electromagnetic valve, a common valve passageway extending between said first and second valve bores that is configured to communicate with said accumulator, a first remote valve port extending through said first valve block to said first valve bore and configured to be connected to said first hydraulic line, and a second remote valve port extending through said first valve block to said second valve bore and configured to be connected to said second hydraulic line;
a second remote valve assembly including a second valve block having a first valve bore configured to receive said first electromagnetic valve, a second valve bore configured to receive said second electromagnetic valve, a passageway extending through said second valve block from said first valve bore to said accumulator, a first remote valve port extending through said second valve block to said first valve bore and configured to be connected to said first hydraulic line, a second remote valve port extending through said second valve block to said second valve bore and configured to be connected to said second hydraulic line, a third remote valve port arranged in fluid communication with said first valve bore and configured to be connected to a third hydraulic line, a fourth remote valve port arranged in fluid communication with said second valve bore and configured to be connected to a fourth hydraulic line, and a switch valve having a first position where said switch valve opens a fluid connection between said first and second valve bores and a second position where said switch valve closes said fluid connection between said first and second valve bores; and
a third remote valve assembly including a third valve block having a first valve bore configured to receive said first electromagnetic valve, a second valve bore configured to receive said second electromagnetic valve, a common valve passageway extending between said first and second valve bores that is configured to communicate with said accumulator, a first remote valve port extending through said third valve block to said first valve bore and configured to be connected to said first hydraulic line, a second remote valve port extending through said third valve block to said second valve bore and configured to be connected to said second hydraulic line, a third remote valve port arranged in fluid communication with said common valve passageway and configured to be connected to a third hydraulic line, a fourth remote valve port arranged in fluid communication with either said first valve bore or said second valve bore depending on a position of a switch valve having a first position where said switch valve connects said fourth remote valve port in fluid communication with said first valve bore and a second position where said switch valve connects said fourth remote valve port in fluid communication with said second valve bore, wherein said first, second, and third remote valve assemblies are interchangeable and any one of said first, second, and third remote valve assemblies can accommodate said first and second electromagnetic valves and said accumulator and be connected to said damper via said first and second hydraulic lines at a position that is spaced away from said damper.

* * * * *